US012585247B2

(12) United States Patent
Yu et al.

(10) Patent No.: US 12,585,247 B2
(45) Date of Patent: Mar. 24, 2026

(54) COMPONENT INTERFACE MODULE WITH ENHANCED USER CONVENIENCE

(71) Applicants:KOREA HYDRO & NUCLEAR POWER CO., LTD, Gyeongju-si (KR); REALGAIN CO., LTD., Seoul (KR)

(72) Inventors: Kyung Tak Yu, Seongnam-si (KR); Sang Hun Son, Bucheon-si (KR); Dae Young Park, Seoul (KR); Yoong Hee Lee, Busan (KR); Tae Jun Shin, Ulsan (KR)

(73) Assignees: KOREA HYDRO & NUCLEAR POWER CO., LTD, Gyeongju-si (KR); REALGAIN CO., LTD., Seoul (KR)

( * ) Notice: Subject to any disclaimer, the term of this patent is extended or adjusted under 35 U.S.C. 154(b) by 323 days.

(21) Appl. No.: 18/257,360

(22) PCT Filed: Jan. 14, 2022

(86) PCT No.: PCT/KR2022/000767
§ 371 (c)(1),
(2) Date: Jun. 14, 2023

(87) PCT Pub. No.: WO2022/154594
PCT Pub. Date: Jul. 21, 2022

(65) Prior Publication Data
US 2024/0012392 A1     Jan. 11, 2024

(30) Foreign Application Priority Data
Jan. 18, 2021     (KR) ........................ 10-2021-0007073

(51) Int. Cl.
*G05B 19/41*       (2006.01)
*F16K 31/04*       (2006.01)
(Continued)

(52) U.S. Cl.
CPC .......... *G05B 19/418* (2013.01); *F16K 31/046* (2013.01); *G21D 3/001* (2013.01);
(Continued)

(58) Field of Classification Search
CPC ....... G05B 19/418; G05B 9/03; F16K 31/046; G21D 3/001; G21D 3/008; G21D 3/04;
(Continued)

(56) References Cited

U.S. PATENT DOCUMENTS 5,745,539 A       4/1998 Lang
2004/0010324 A1*    1/2004 Bednar .................... G05B 9/03
                                                              700/2
(Continued)

FOREIGN PATENT DOCUMENTS

KR      10-2004-0037096 A      5/2004
KR      10-2009-0022929 A      3/2009
(Continued)

OTHER PUBLICATIONS

Jae Cheon Jung, "Local component interface module characterizing common cause failure tolerance and condition/performance monitoring capability and method for developing the same" (espacenet machine translation of KR102003748), Jul. 25, 2019, espacenet machine translation (Year: 2019).*

*Primary Examiner* — Christopher W Carter

(57) ABSTRACT

A component interface module with enhanced user convenience, according to the present invention, is a component interface module for managing the interface between a control system, which generates component command signals, and components, which generates component feedback signals, wherein the components are classified into first to third component groups, the component interface module is formed from first to third component interface modules, each of the first to third component interface modules
(Continued)

includes: an input port; a processor including a priority logic, a component logic and a diagnostic logic; and an output device, the priority logic is set using a four-contact rotary switch for selecting any one of four settings in order to set the priority for the component command signals, and the component logic is set using a control rotary switch of each of the first to third component interface modules.

10 Claims, 23 Drawing Sheets

(51) Int. Cl.

| | | |
|---|---|---|
| *G05B 19/418* | (2006.01) |
| *G21D 3/00* | (2006.01) |
| *H01F 7/18* | (2006.01) |
| *H02P 1/04* | (2006.01) |
| *G21D 3/04* | (2006.01) |

(52) U.S. Cl.
CPC ........... *G21D 3/008* (2013.01); *H01F 7/1877* (2013.01); *H02P 1/04* (2013.01); *G21D 3/04* (2013.01)

(58) Field of Classification Search
CPC . H01F 7/1877; H01F 7/18; H02P 1/04; H02P 29/024
See application file for complete search history.

(56) References Cited

U.S. PATENT DOCUMENTS

| | | | |
|---|---|---|---|
| 2008/0054857 A1* | 3/2008 | Cook ........................ H02P 1/22 |
| | | | 322/13 |
| 2020/0082952 A1* | 3/2020 | Bae ........................ G21D 3/008 |

FOREIGN PATENT DOCUMENTS

| | | |
|---|---|---|
| KR | 10-1244015 B1 | 3/2013 |
| KR | 10-2003748 B1 | 7/2019 |
| KR | 10-2311225 B1 | 10/2021 |

* cited by examiner

FIG. 2

Priority P01
Port X only

Port X
Hardwired

Port Z
Remote Manual

Local Manual
Switch

Disable ALL
Switch

Priority P03
Open Priority

Port X
Hardwired

Port Y
Hardwired

Port Z
Remote Manual

Local Manual
Switch

Disable ALL
Switch

Priority P04
X Priority

Port X
Hardwired

Port Y
Hardwired

Port Z
Remote Manual

Local Manual
Switch

Disable ALL
Switch

Disable ALL, Reset Switch

Priority Logic
Q, R Signal

Field Component
Feedback Signal

Buffer B02
Reversing Motor Starters
(Full Throw)

Buffer B03
Solenoid or Damper
Coil

Priority Logic
Q, R Signal

Field Component
Feedback Signal

Disable ALL, Reset
Switch

Disable ALL, Reset
Switch

Buffer B05
Fire Damper Coil

Priority Logic
Q, R Signal

Field Component
Feedback Signal

Buffer B07
Load Center Breakers
W/O Anti Pumiping

Reset Switch

Buffer Select
Switch
0=B01, 1=B07

Priority Logic
Q, R Signal

Field Component
Feedback Signal

Disable ALL
Switch

Buffer Logic - LCB
(Load Center Breakers)
B01, B07

**Buffer Logic-MS
(Motor Starters)
B02, B04, B06**

Disable A.L.L. Reset Switch

Buffer Logic-SC
(Solenoid or Coil)
B03, B05

Priority Logic
Q, R Signal

Buffer Select
Switch
0=B03, 1=B05

Field Component
Feedback Signal

COMPONENT INTERFACE MODULE WITH ENHANCED USER CONVENIENCE

TECHNICAL FIELD

The present disclosure relates to a component interface module (CIM) with enhanced user convenience by setting a logic for controlling components using a rotary switch.

BACKGROUND ART

In the case of APR1400 nuclear power plants, the engineering safety feature-component control system (ESF-CCS) is installed; in the event of an accident according to the power plant design specifications, such as loss of reactor coolant flow, main steam line break, ejection of a rod cluster control assembly, and increase of feed-water flow, the engineering safety feature-component control system (ESF-CCS) controls the engineering safety feature components to mitigate the effects of the accident by receiving an engineering safety feature operation start signal from the power plant protection system and radiation monitoring system or a manual operation start signal from an operator.

The engineering safety feature-component control system (ESF-CCS) includes a component interface module (CIM) responsible for the interface between the control system and components (various field devices, motors, valves, circuit breakers, and so on). The component interface module (CIM) includes an input port to which component command signals from different systems are input, a processor that arbitrates the component command signals and integrates the signals with component feedback signals to generate component control signals, and an output device in the form of a repeater that outputs the component control signals to the components. Here, the processor includes a priority logic that arbitrates between sets of component command signals to select a priority component command signal, a component logic (a universal component logic or a buffer logic) that integrates the feedback signal of a selected component with a priority component command signal selected by the priority logic, and a diagnostic analysis logic that performs diagnostics on the component interface module (CIM).

FIG. 1 shows the structure of a component interface module (CIM) according to the prior art. As shown in FIG. 1, the component interface module (CIM) 100 includes port X 10 connected to a loop controller (PLC) 11, which is a first main system, and port Y 20 connected to the diverse protection system (DPS), which is a second main system, port Z 30 connected to a plant main control room, an emergency control room, or a diverse manual actuation system (DMA) 31 located on a predetermined local control panel within the plant, and a local manual switch (LMS) 40.

The main part of the component interface module (CIM) 100 is the processor 50. In the exemplary module, a field programmable gate array (FPGA) is used as the processor 50. The processor 50 performs a logic function on the inputs received through the ports 10, 20, 30 and the switch 40 to generate control signals applied to output devices in the form of a repeater 60, 70. The component 80 provides a component feedback signal 90 to the FPGA 50 of the component interface module (CIM) 100. In this way, the component interface module (CIM) 100 arbitrates component command signals input through port X 10, port Y 20, and port Z 30 according to the priority logic and the component logic and generates a component control signal by integrating the component command signals with the component feedback signal.

The priority logic provided to the Component Interface Module (CIM) may be described as follows.

The local manual switch 40 has the highest priority.

The input to the port Z has a higher priority than the host system 11, 21.

The priority of the host system is configured as follows.

Port X has priority

Port Y has priority

Open/Start command signal has priority

Close/Stop command signal has priority

The priority logic operates on the general principle for command signals in one direction (e.g., open or close) which blocks an opposing command signal from a lower priority port. The component interface modules currently used in the Shin-Kori 3 and 4 or Baraka 1, 2, 3, and 4 in the UAE were constructed so that the priority between the ports X and Y is selected by two configuration jumpers denoted by JP1 and JP2 according to Table 1.

TABLE 1

Jumper settings for priority selection

| Priority mode | JP1 | JP2 |
|---|---|---|
| System X has priority over system Y | — | — |
| System Y has priority over system X | — | √ |
| Open (start) command has priority over close command | √ | — |
| Close (stop) command has priority over open command | √ | √ |

Also, the component interface module selects a specific function for the component by configuring the jumpers embedded in the component interface module as shown in Table 2.

TABLE 2

Definitions of jumper settings

| Jumper | If present (ON) | If not present (OFF) |
|---|---|---|
| JP3 | Position inputs of CN1 and CN2 are inverted | Position inputs of CIN1 and CIN2 are not inverted |
| JP4 | Remove open/start command from torque input (CIN3) | Remove open/start command from position input (CIN1) |
| JP5 | Remove close/stop command from torque input (CIN4) | Remove close/stop command from position input (CIN2) |
| JP6 | Do not perform a logic combination of torque and position switches on CIM | Perform a logic combination of torque and position switches by CIM |

TABLE 2-continued

| Definitions of jumper settings | | |
| --- | --- | --- |
| Jumper | If present (ON) | If not present (OFF) |
| JP7 | Command is not blocked by CIN5 interlock input | Command is blocked by CIN5 interlock input |
| JP8 | CIN5 is used for trip command output | CIN5 interlock input is ignored |
| JP9 | Command is not blocked by CIN6 interlock input | Command is blocked by CIN6 interlock input |
| JP10 | CIN6 is used for trip command output | CIN6 interlock input is ignored |
| JP11 | Removal of component command is delayed by 10 seconds | Component command is removed immediately |
| JP12 | Command remains after completion of component move | Command is removed after completion of component move |
| JP13 | When JP14 is off, components may not be inverted until their move is completed | Counter-command takes effect immediately |
| JP14 | CIM command is not latched | CIM command is latched |
| JP15 | When the breaker is closed, trip command is activated before other closure (anti-pump latch) | Anti-pump latch is not used |
| JP16 | CIN3, CIN4 logic inversion | Use default logic of CIN3, CIN4 (True when LOW) |
| JP19 | Use port X command and CIN7 and CIN8 to be paired | CIN7, CIN8 not used |
| JP20 | Configure coexistence prevention logic | |
| JP22 | Configure coexistence prevention logic | |

However, since the component interface module (CIM) currently used in Shin-Kori 3 and 4 or Barakah 1, 2, 3, and 4 requires a series of jumper operations to operate 14 different types of components (field devices) employed in the nuclear power plant APR1400, non-skilled users may encounter difficulties in operating and maintaining the equipment. In addition, to change the control target component, it is necessary to change the jumper settings after disassembling the corresponding module, which entails more effort for maintenance. The existing component interface module (CIM) does not indicate which component is currently under control and does not clearly display the diagnostic results for identifying the source of any error in the CIM itself. The above problem may lead to significant inconvenience as it requires actions to modify the current control target component, including stopping the facility, disassembling the component interface module (CIM), and changing jumper settings.

DISCLOSURE

Technical Problem

An object of the present disclosure is to provide a component interface module (CIM) with enhanced user convenience, which supplements the problem in the existing component interface module (CIM) and improves the priority logic, component logic, and others thereof.

Technical Solution

To achieve the object above, a component interface module with enhanced user convenience according to one embodiment of the present disclosure is a component interface module for managing the interface between a control system, which generates component command signals, and components, which generate component feedback signals, wherein the components are classified into first to third component groups according to an operating method and a component logic, the component interface module is formed from first to third component interface modules controlling the first to third component groups respectively, and each of the first to third component interface modules includes: an input port to which the component command signal is input from the control system, a processor including a priority logic for configuring a priority for the component command signals; a component logic generating a component control signal by integrating a component feedback signal of the component with a priority component command signal selected by the priority logic and including a dedicated logic circuit for each of the first to third component interface modules; and a diagnostic analysis logic for diagnosing operability of the component, and an output device outputting the component control signal to the component, wherein the priority logic of each of the first to third component interface modules is set by selecting any one of four settings using a four-contact rotary switch, and the component logic of each of the first to third component interface modules is set using a control rotary switch.

The component interface module further includes a display unit for displaying a component under control or displaying a built-in error state diagnosed by the diagnostic analysis logic according to the priority of the error state.

The display unit is composed of 7-segment LEDs.

The control system is a loop controller, a diverse protection system, a diverse manual actuation system, and a local manual switch.

The input port includes port X to which the component command signal is input from the loop controller, port Y to which the component command signal is input from the diverse protection system, and port Z to which the component command signal is input from the diverse manual actuation system.

The four settings of the priority logic comprise P01 setting receiving a signal only from port X, P02 setting receiving signals from ports X and Y and setting priority to closing, P03 setting receiving signals from ports X and Y and setting priority to opening, and P04 setting receiving signals from ports X and Y and setting priority to port X.

The first component group is a load center breaker group, the second component group is a motor starter group, and the third component group is a solenoid or coil group.

The components of the load center breaker group are classified into either a load center breaker or a load center breaker without anti-pumping.

The components of the motor starter group are classified into one of a reversing motor starter for full throw MOV, a non-reversing motor starter, and a reversing motor starter for throttling MOV.

The components of the solenoid or coil group are classified into one of a solenoid or damper coil and a fire damper coil.

The component logic of the first component interface module includes B1 setting corresponding to a load center breaker and B2 setting corresponding to a load center breaker without anti-pumping.

The component logic of the second component interface module includes B1 setting for selecting a reversing motor starter for full throw MOV, B2 setting for selecting a non-reversing motor starter, and B3 setting for selecting a reversing motor starter for throttling MOV.

The component logic of the third component interface module includes B1 setting for selecting a solenoid and damper coil and B2 setting for selecting a fire damper coil.

Advantageous Effects

The present disclosure classifies engineering safety feature components into three groups with a similar operating method and component logic, implements a logic for each group in respective processors, and uses a rotary switch to allow the user to set a logic of each component interface module (CIM). Since it is not required to disassemble a module and change jumper settings to change a control target component, the present disclosure provides a component interface module (CIM) with enhanced user convenience, simplifies logic setting of the component interface module (CIM), and improves intuitiveness and convenience when the component interface module (CIM) is used.

DESCRIPTION OF DRAWINGS

FIG. 2 shows a logic circuit corresponding to P01 setting in the priority logic of a CIM according to the present disclosure.

6

Figure 8:
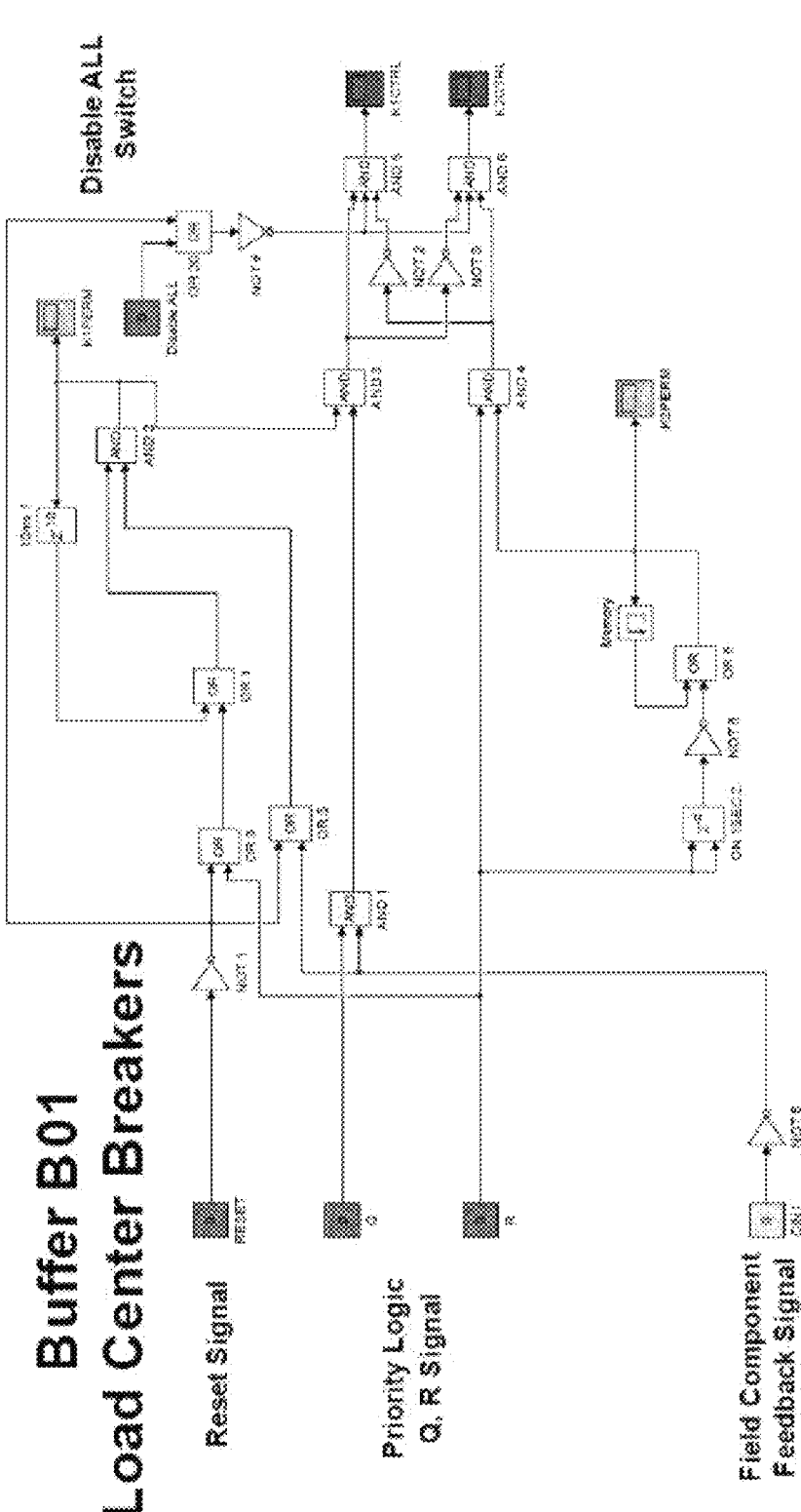

FIG. 8 illustrates a logic circuit of a component logic (universal component logic, buffer logic) for operating load center breakers according to the present disclosure.

Figure 9:
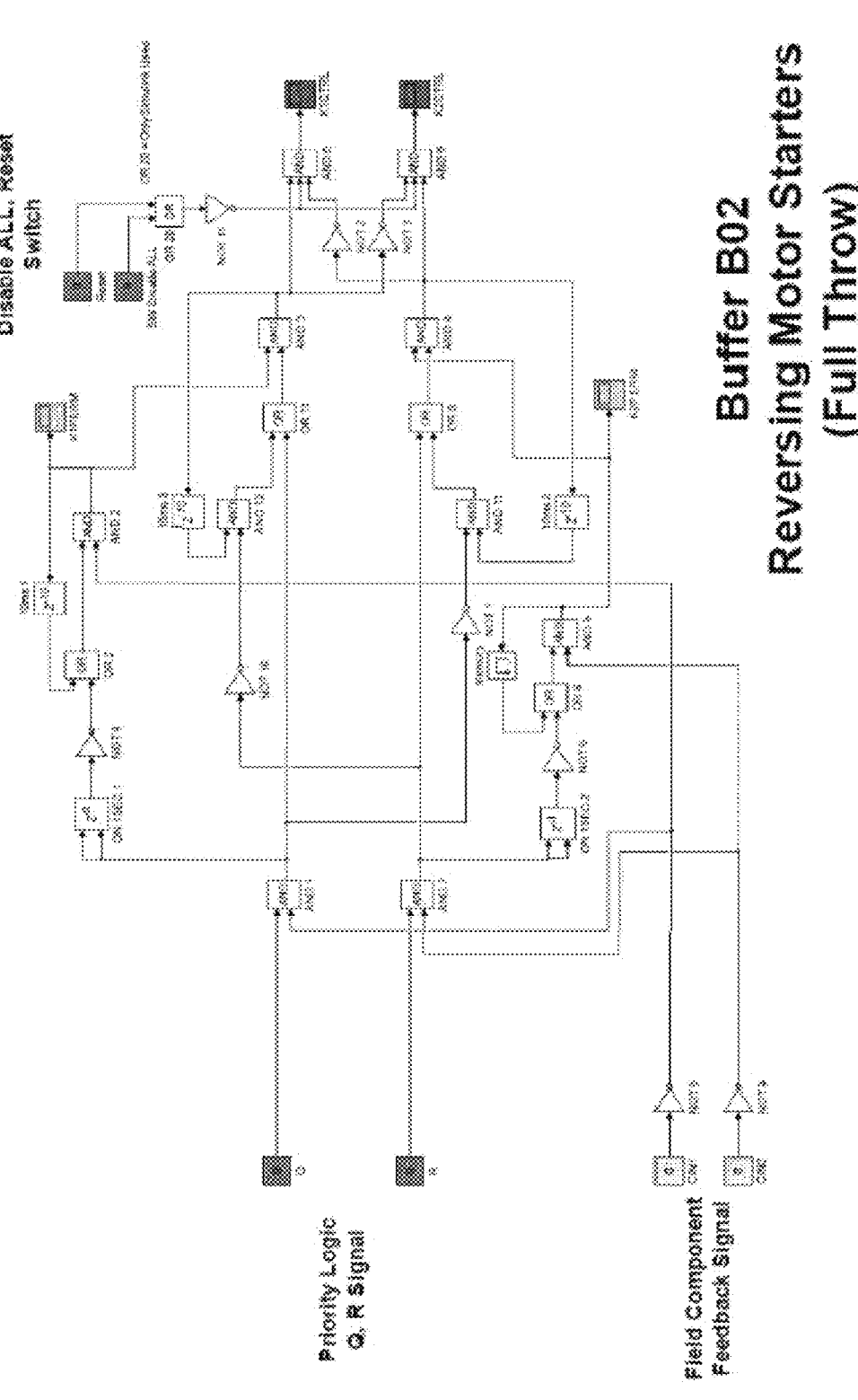

FIG. 9 illustrates a logic circuit of a component logic for operating reversing motor starters for full throw MOV according to the present disclosure.

Figure 10:
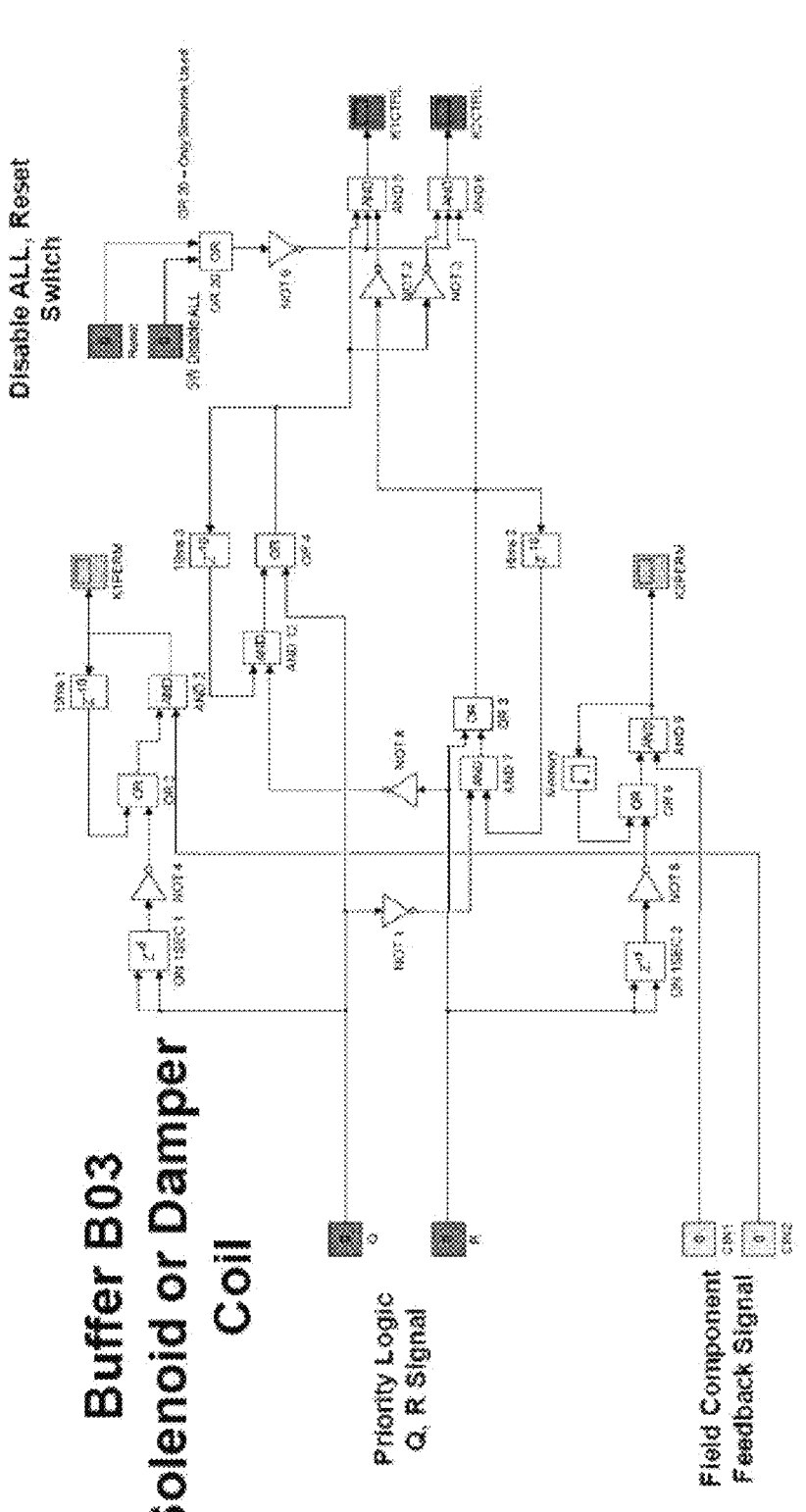

FIG. 10 illustrates a logic circuit of a component logic for operating a solenoid or damper coil according to the present disclosure.

Figure 11:
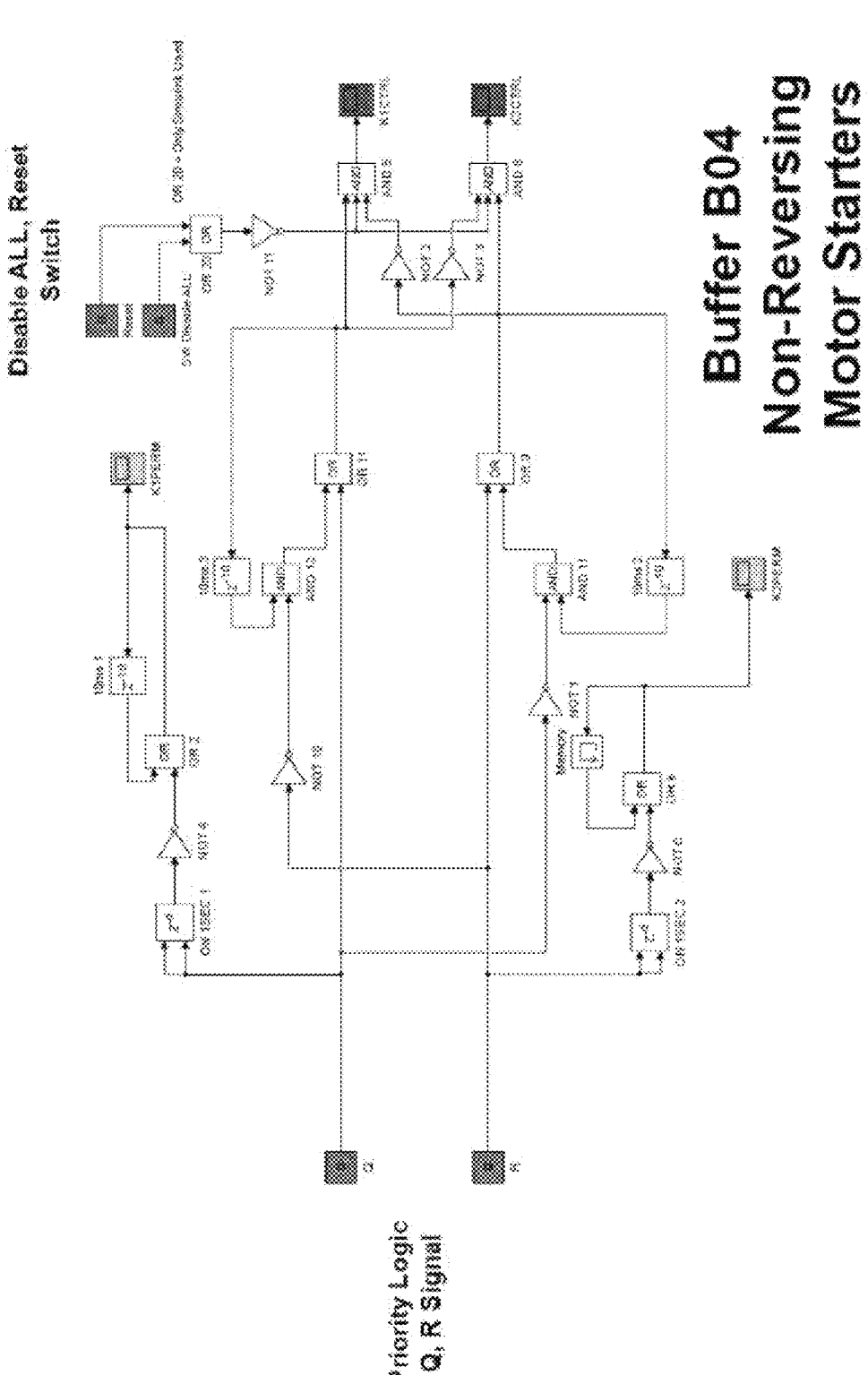

FIG. 11 illustrates a logic circuit of a component logic for operating non-reversing motor starters according to the present disclosure.

Figure 12:
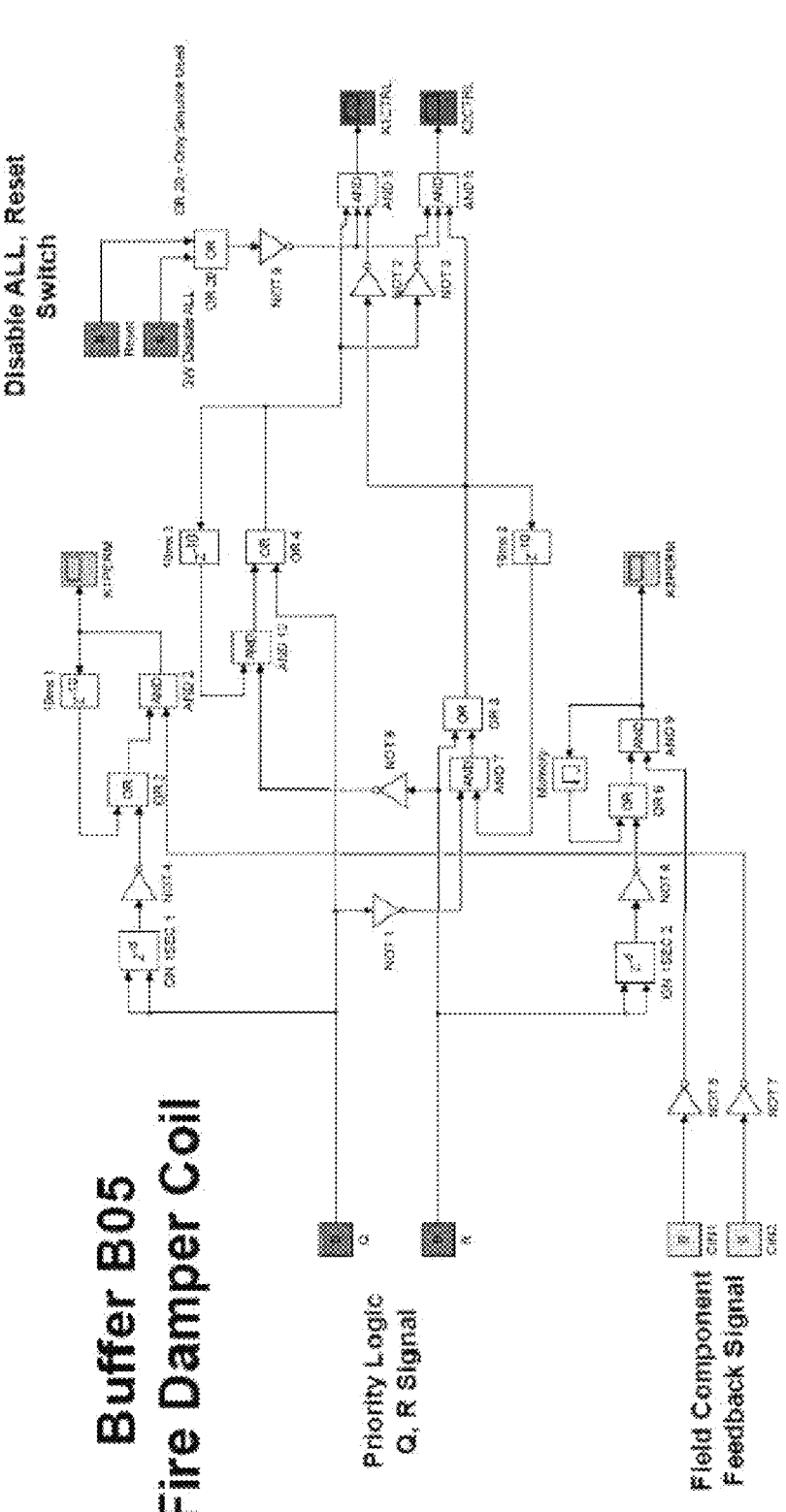

FIG. 12 illustrates a logic circuit of a component logic for operating a fire damper coil according to the present disclosure.

Figure 13:
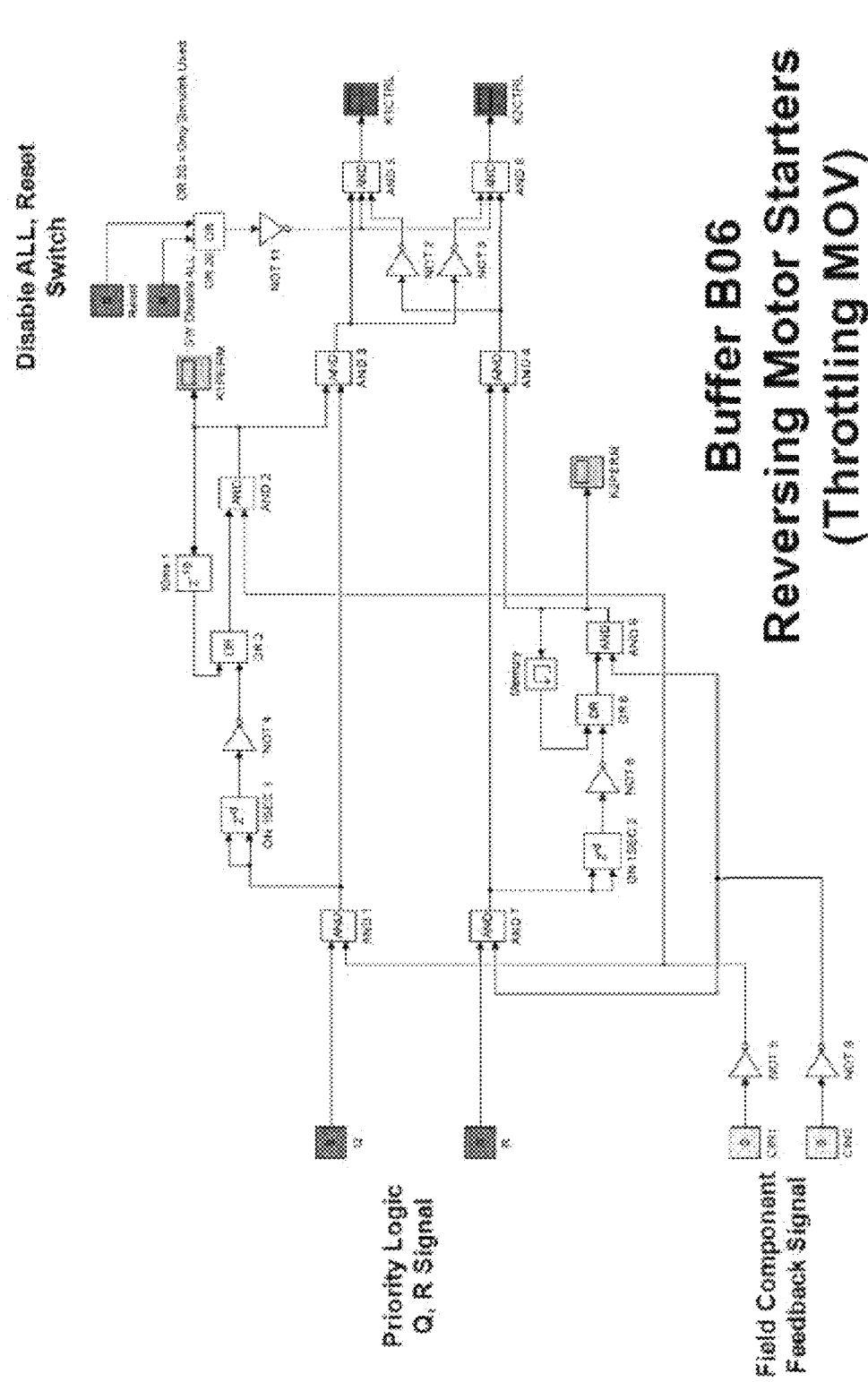

FIG. 13 illustrates a logic circuit of a component logic for operating reversing motor starters for throttling MOV according to the present disclosure.

Figure 14:
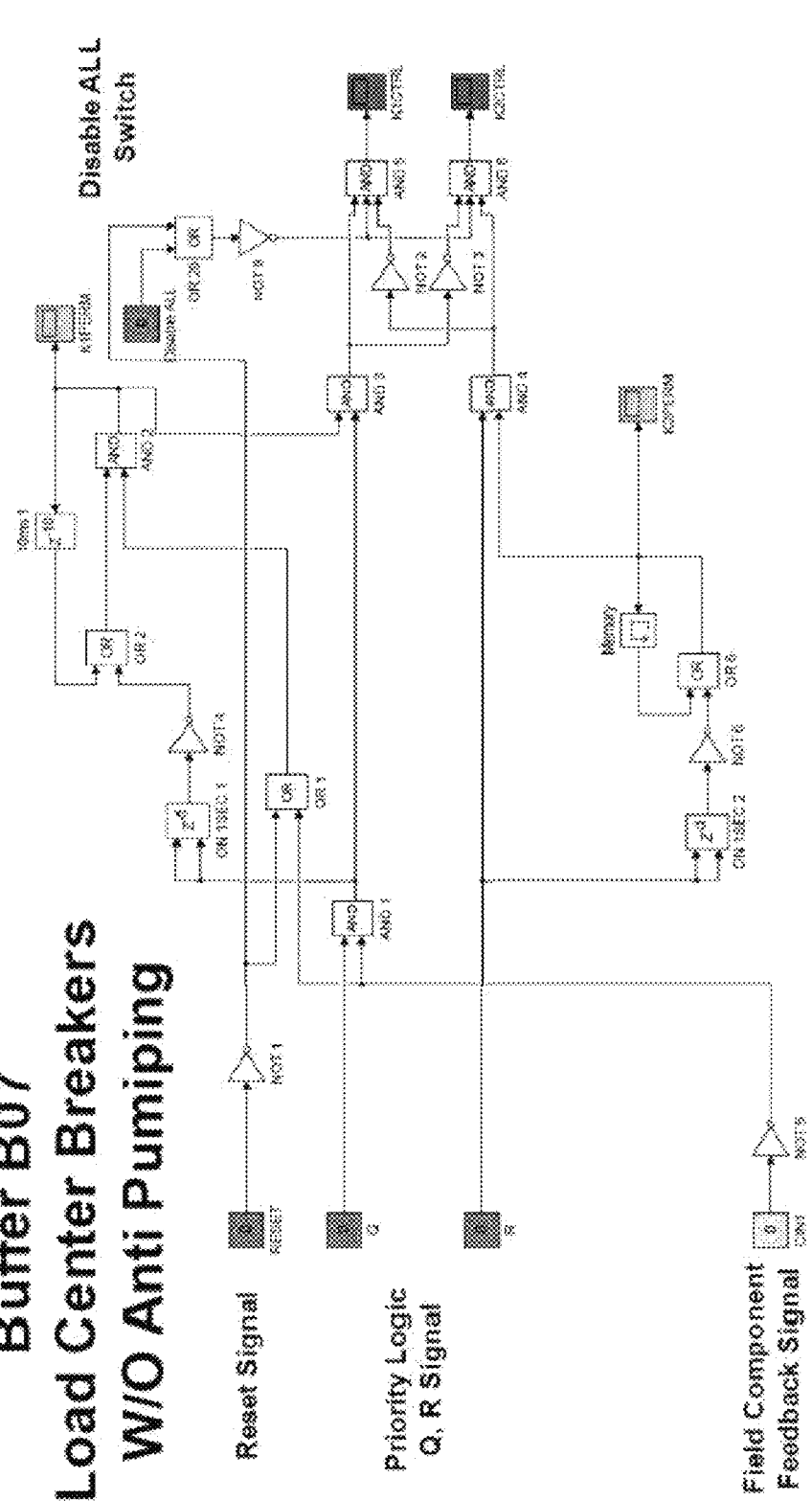

FIG. 14 illustrates a logic circuit of a component logic for operating load center breakers without anti-pumping according to the present disclosure.

Figure 15:
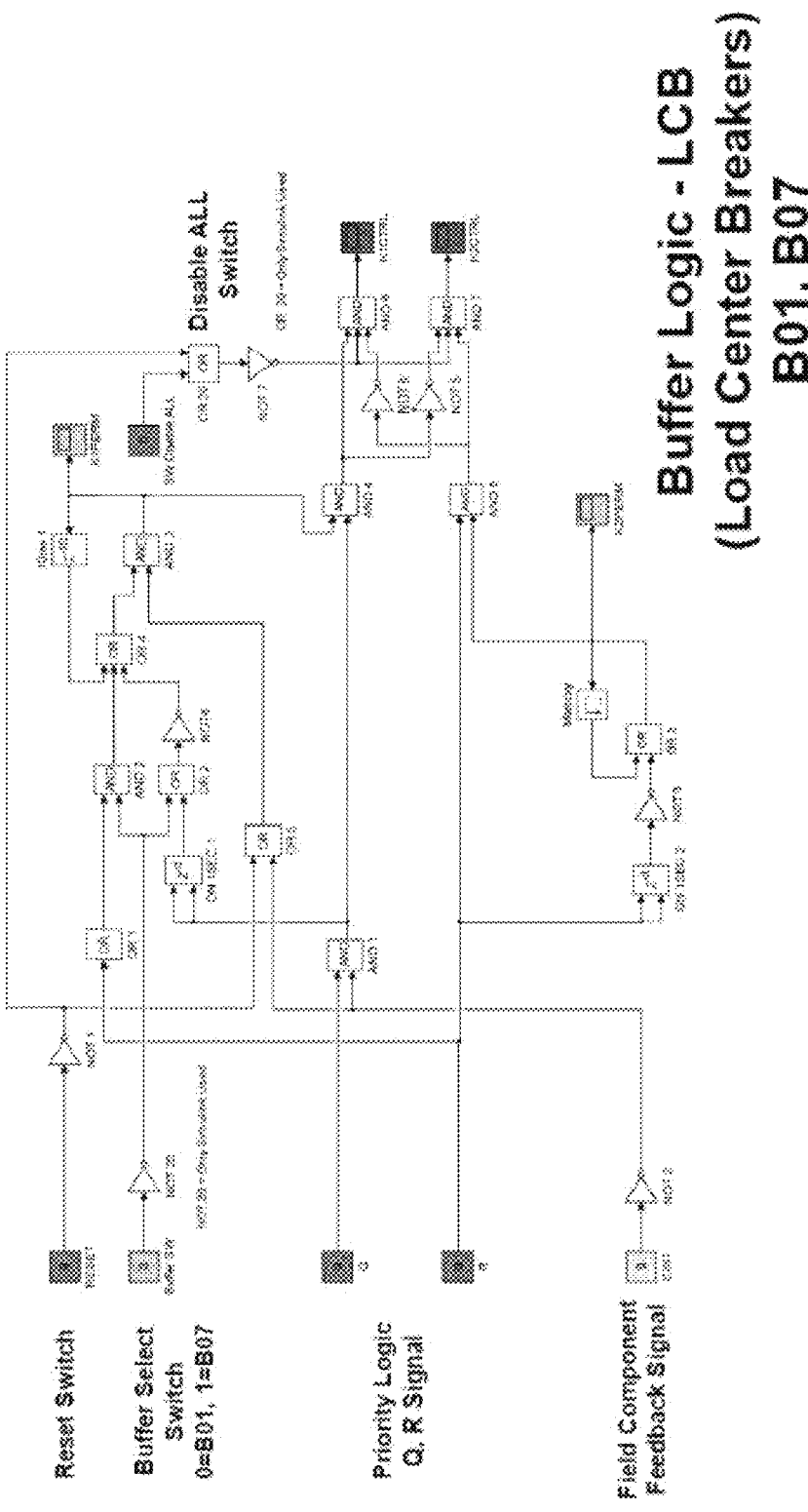

FIG. 15 illustrates a logic circuit of a load center breaker (LCB) group according to the present disclosure.

Figure 16:
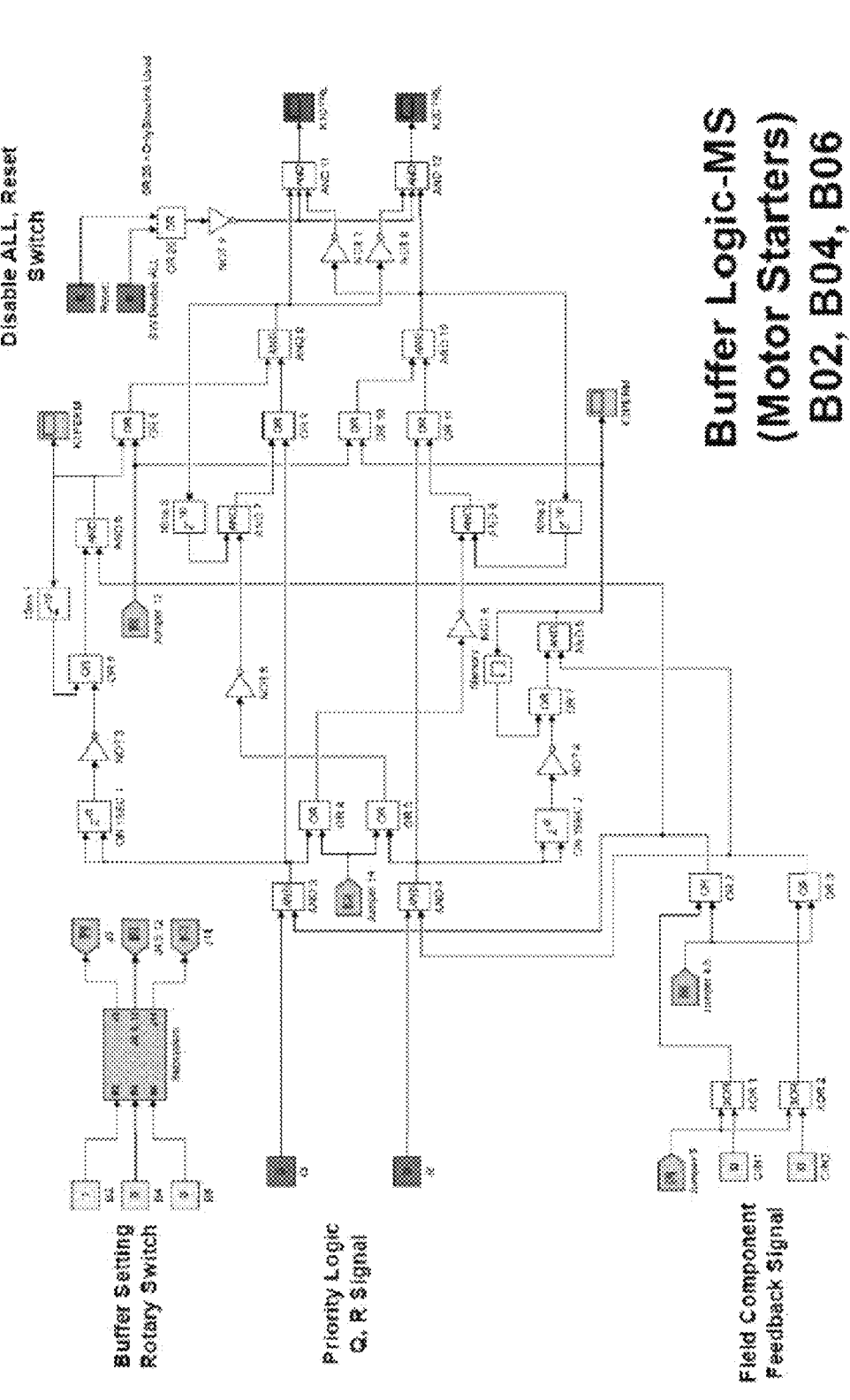

FIG. 16 illustrates a logic circuit of a motor starter (MS) group according to the present disclosure.

Figure 17:
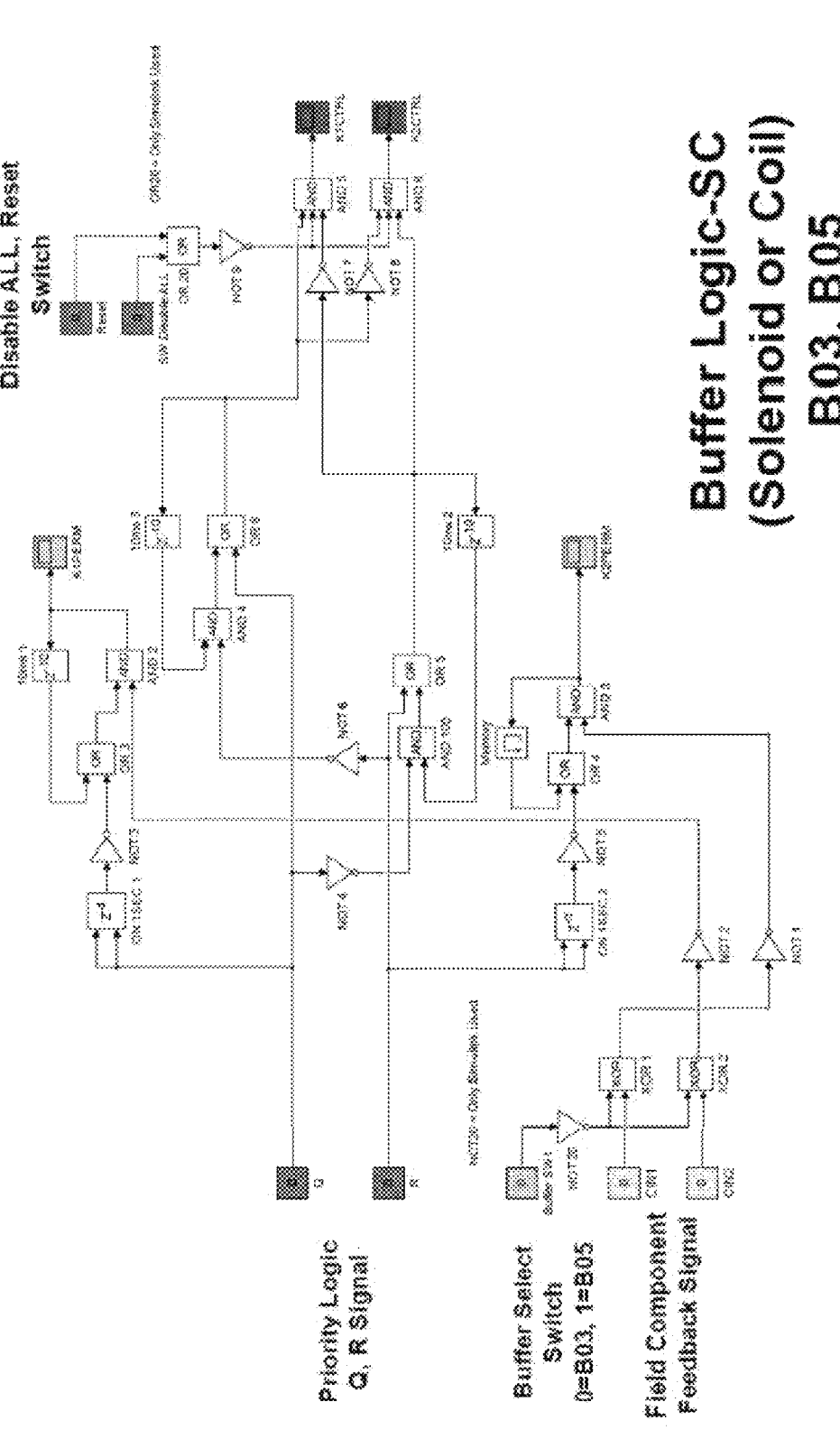

FIG. 17 illustrates a logic circuit of a solenoid or coil (SC) group according to the present disclosure.

Figure 18:
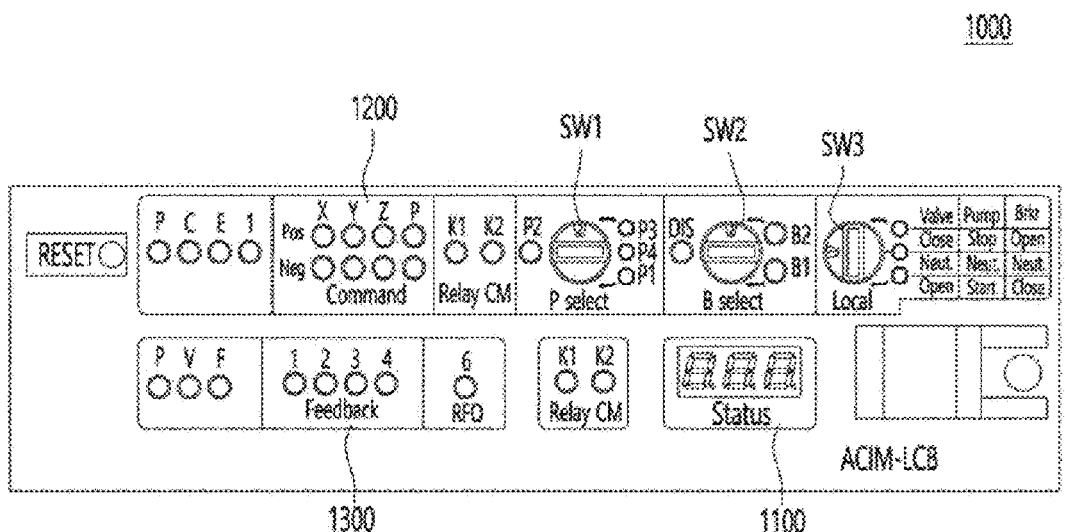
Figure 19:
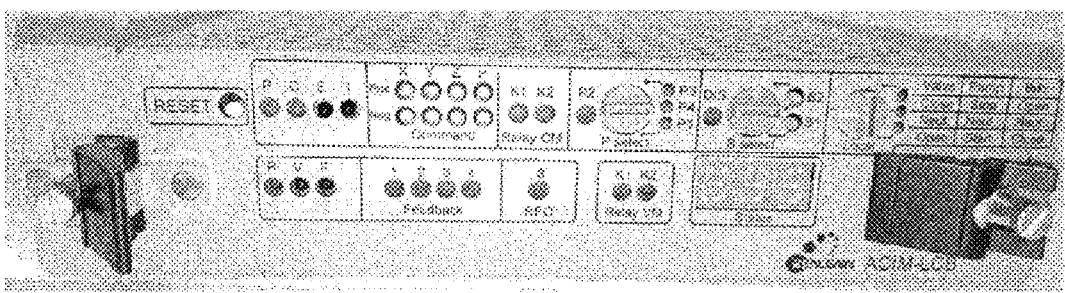

FIGS. 18 and 19 show a schematic drawing and a photo illustrating the front of a component interface module (CIM) for an LCB group according to the present disclosure.

Figure 20:
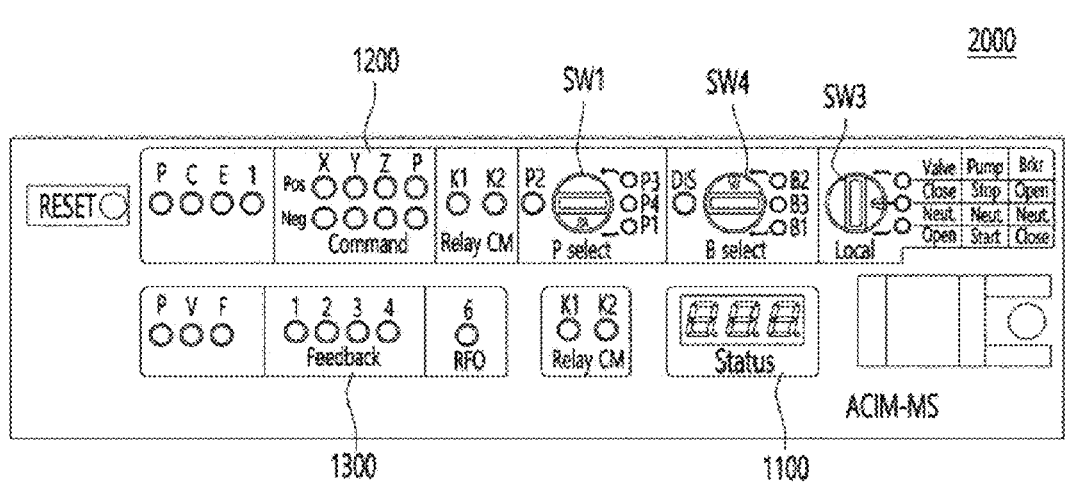
Figure 21:
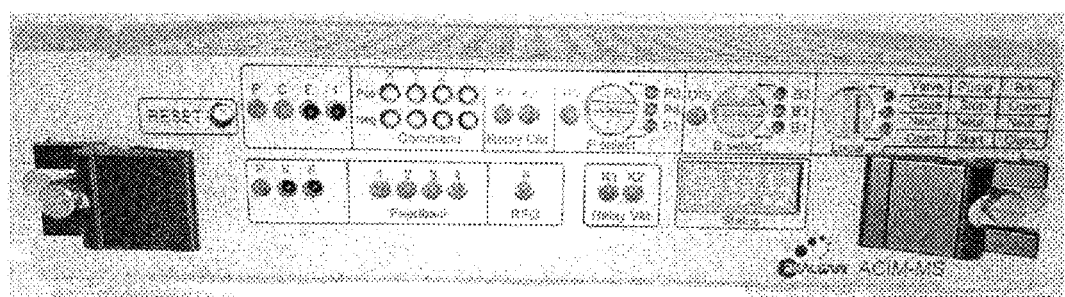

FIGS. 20 and 21 show a schematic drawing and a photo illustrating the front of a component interface module (CIM) for an MS group according to the present disclosure.

Figure 22:
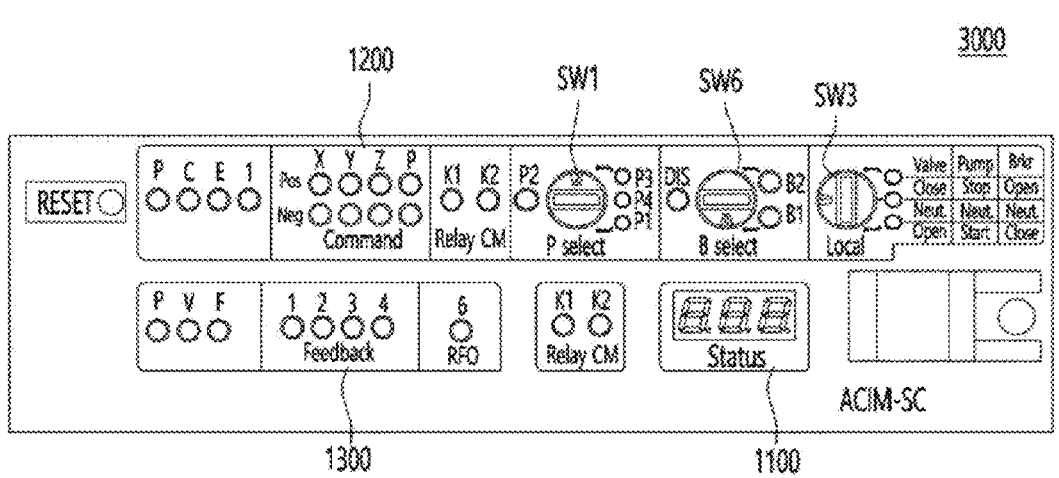
Figure 23:
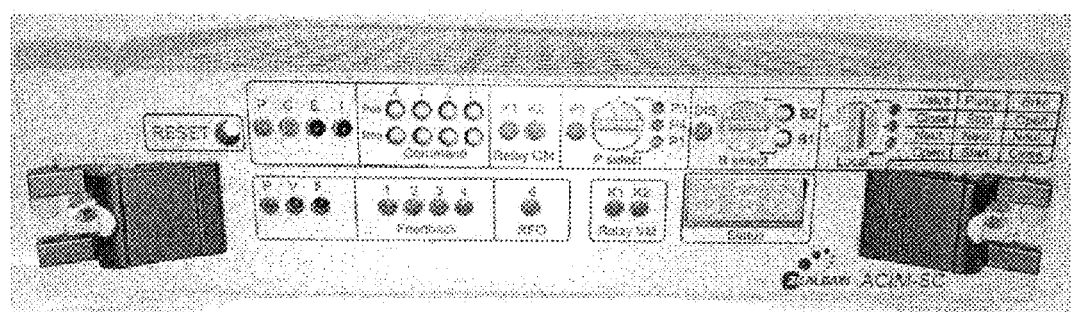

FIGS. 22 and 23 show a schematic drawing and a photo illustrating the front of a component interface module (CIM) for an SC group according to the present disclosure.

MODE FOR DISCLOSURE

In what follows, embodiments of the present disclosure will be described in detail with reference to appended drawings, where the same or similar constituting elements are given the same reference number irrespective of their drawing symbols, and repeated descriptions thereof will be omitted.

Also, in describing an embodiment of the present disclosure, if it is determined that a detailed description of a related art incorporated herein unnecessarily obscures the gist of the embodiment, the detailed description thereof will be omitted. Also, it should be understood that the appended drawings are intended only to help understand embodiments of the present disclosure and do not limit the technical principles and scope of the present disclosure; rather, it should be understood that the appended drawings include all of the modifications, equivalents, or substitutes belonging to the technical principles and scope of the present disclosure.

The present disclosure classifies 14 types of components into three groups based on their operating method and component logic and provides a CIM with priority and component logics dedicated to each component group, obviating the need for jumper setting. Accordingly, the present disclosure provides three types of CIMS equipped with a processor that implements a component logic dedicated to each component group.

Specifically, the present disclosure removes priorities not utilized in nuclear power plants from a conventional CIM and sets the following priority logic to the processor of a CIM using the priorities in use.

First, the priority for the host system is set for the following four cases.

P01—Only port X is used

P02—Port X and Y are used. Priority for close

P03—Port X and Y are used. Priority for open

P04—Port X and Y are used. Priority for port X

In what follows, the priority set for the four cases will be described in detail.

Figure 2:
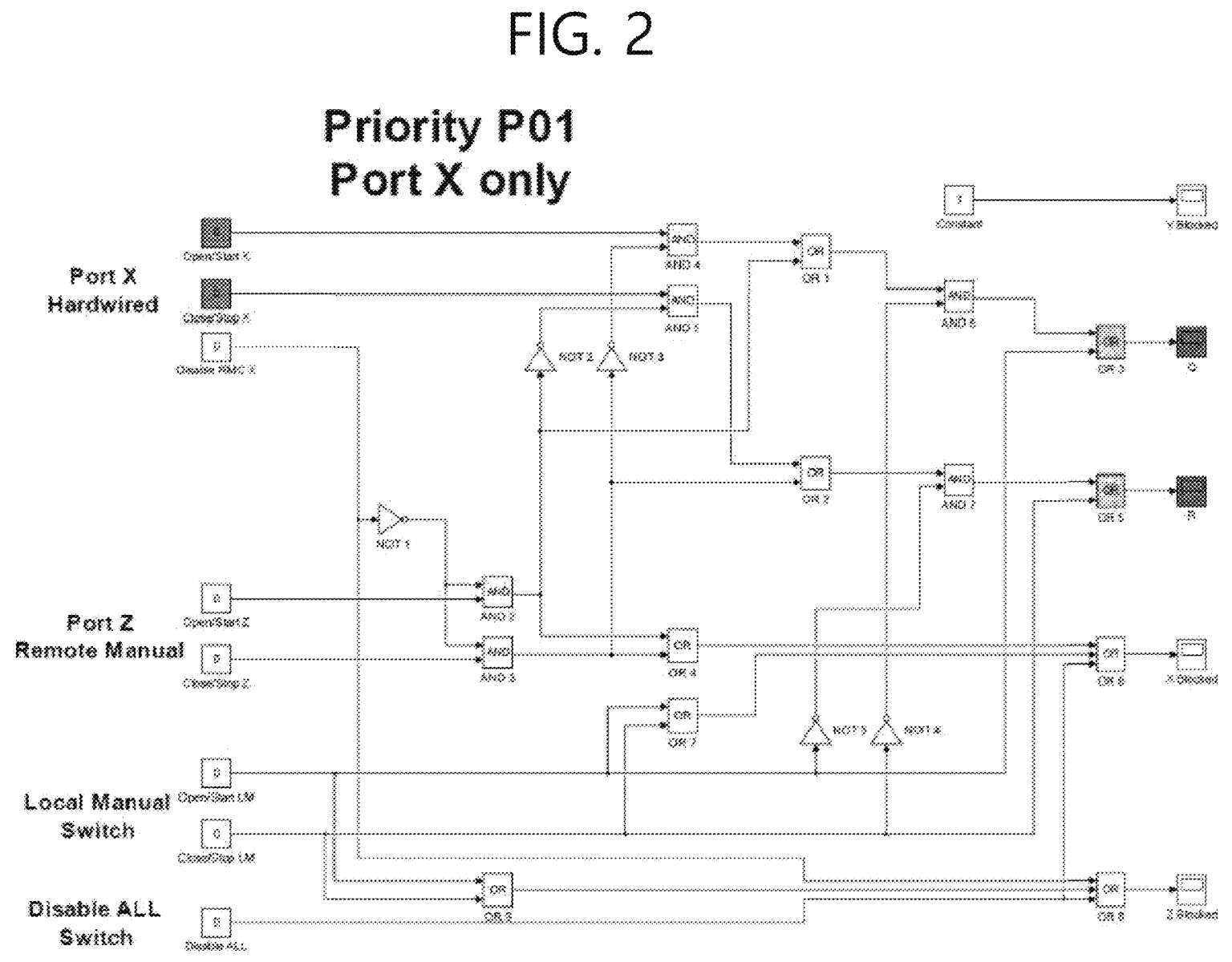

FIG. 2 shows a logic circuit corresponding to P01 setting in the priority logic of a CIM according to the present disclosure. Input signals of P01 are shown below. In the case of P01, only the command signal of the port X, which acts as a host system, is received in addition to the signals from port Z and a local manual switch (LMS).

Input signal

Port X (1) Open/Start X (CMX1)

(2) Close/Stop X (CMX2)

(3) Disable port Z (CMX 3)

Port Z (1) Open/Start Z (CMZ1)

(2) Close/Stop Z (CMZ2)

Local manual switch (LMS)

(1) Open/Start LMS (2) Close/Stop LMS

Disable ALL SW

The port X, port Z, and LMS may transmit Open/Start, Close/Stop command signals that may operate components, and the corresponding signals set priorities based on the priority logic to generate output signals Q and R. The output signals are passed to the component logic (universal component logic) which generates a relay signal. In addition to the Open/Start and Close/Stop commands, the host system may transmit the disable port Z (CMX3) signal, and if the corresponding command signal is transmitted from the host system, the command signal from port Z is ignored. In addition, block signals based on priority are generated, and since port Y is not used in the ('P01') setting, the Y block signal always maintains a high ('1') state.

Output signal (1) Open/Start (Q)

(2) Close/Stop (R)

Block signal (1) X blocked (2) Z blocked

Figure 1:
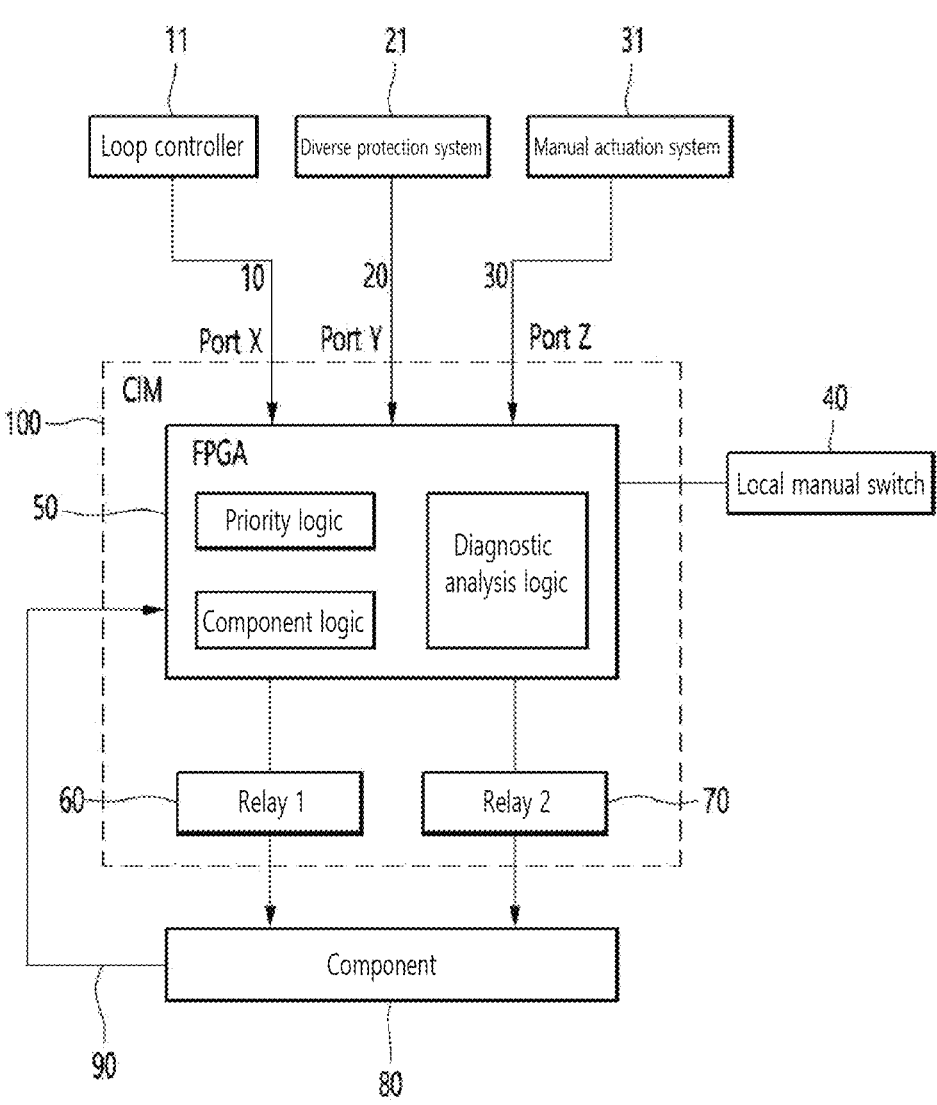
FIG. 1 illustrates the structure of a component interface module (CIM) according to the prior art.
Figure 3:
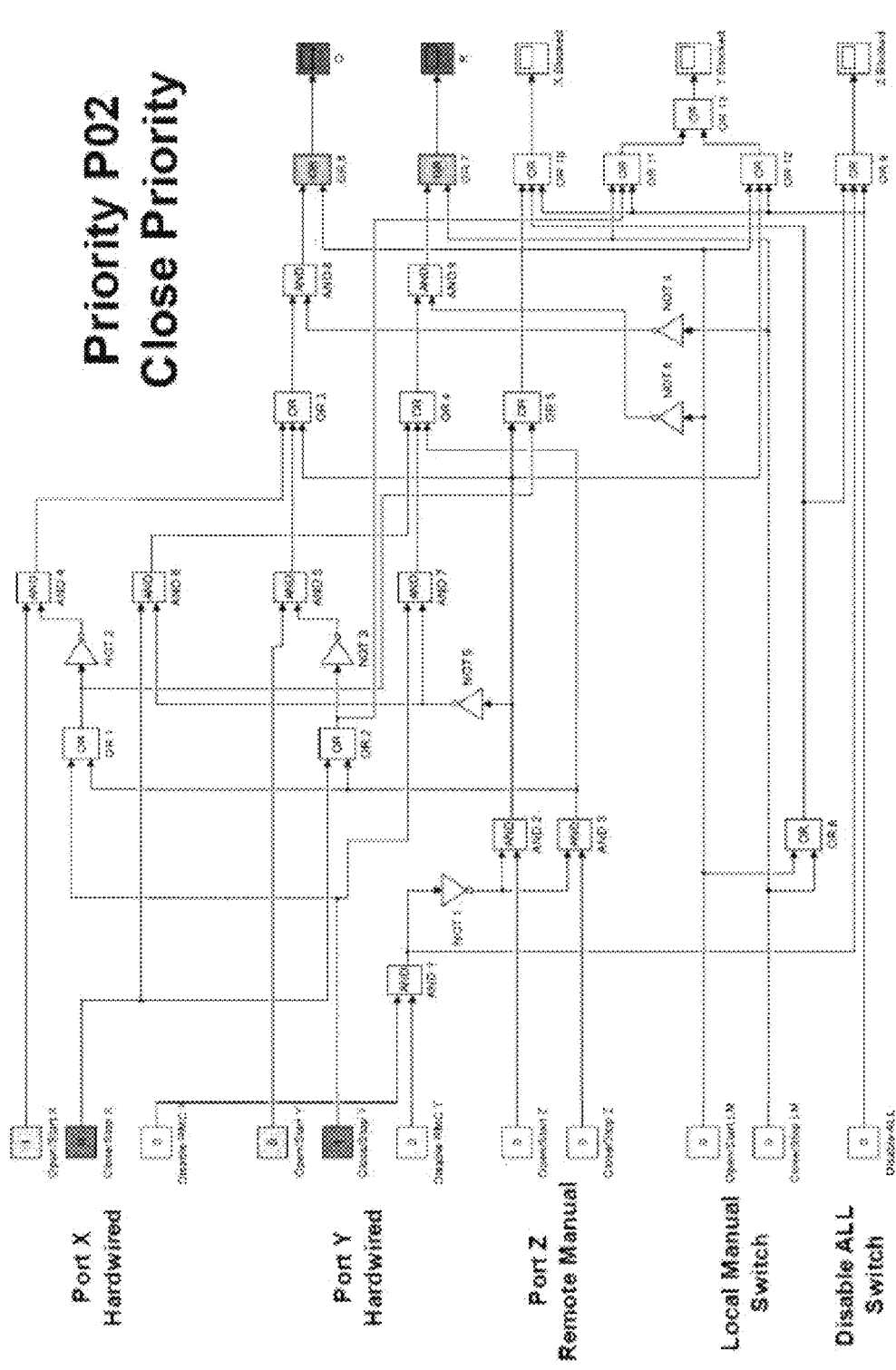
FIG. 3 shows a logic circuit corresponding to P02 setting in the priority logic of a CIM according to the present disclosure.

FIG. 3 shows a logic circuit corresponding to P02 setting in the priority logic of a CIM according to the present disclosure. Input signals of P02 are shown below. In the case of P02, command signals of the ports X and Y, which act as two host systems, are received in addition to the signals from the port Z and the LMS.

Input signal

Port X (1) Open/Start X (CMX1)

(2) Close/Stop X (CMX2)

(3) Disable port Z (CMX 3)

Port Y (1) Open/Start Y (CMY1)

(2) Close/Stop Y (CMY2)

(3) Disable port Z (CMY3)

Port Z (1) Open/Start Z (CMZ1)

(2) Close/Stop Z (CMZ2)

Local manual switch (1) Open/Start LM (2) Close/Stop LM

Disable ALL SW

Manual control (port Z, LMS) has priority over the host system (port X, port Y). When command signals are received simultaneously from both host systems, the P02 setting puts higher priority to the Close/Stop command. The command signal sets priority based on the priority logic to generate output signals Q, R. The output signal is passed to the universal component logic that generates a relay signal. The host system may transmit the disable port Z (CMX 3, CMY 3) signal in addition to the Open/Start and Close/Stop commands, and if the corresponding command signals are transmitted simultaneously from both host systems, the command signal from port Z is ignored. In addition to the above, block signals based on priority are generated.

Output signal (1) Open/Start (Q)

(2) Close/Stop (R)

Block signal (1) X Blocked (2) Y Blocked (3) Z Blocked

Figure 4:
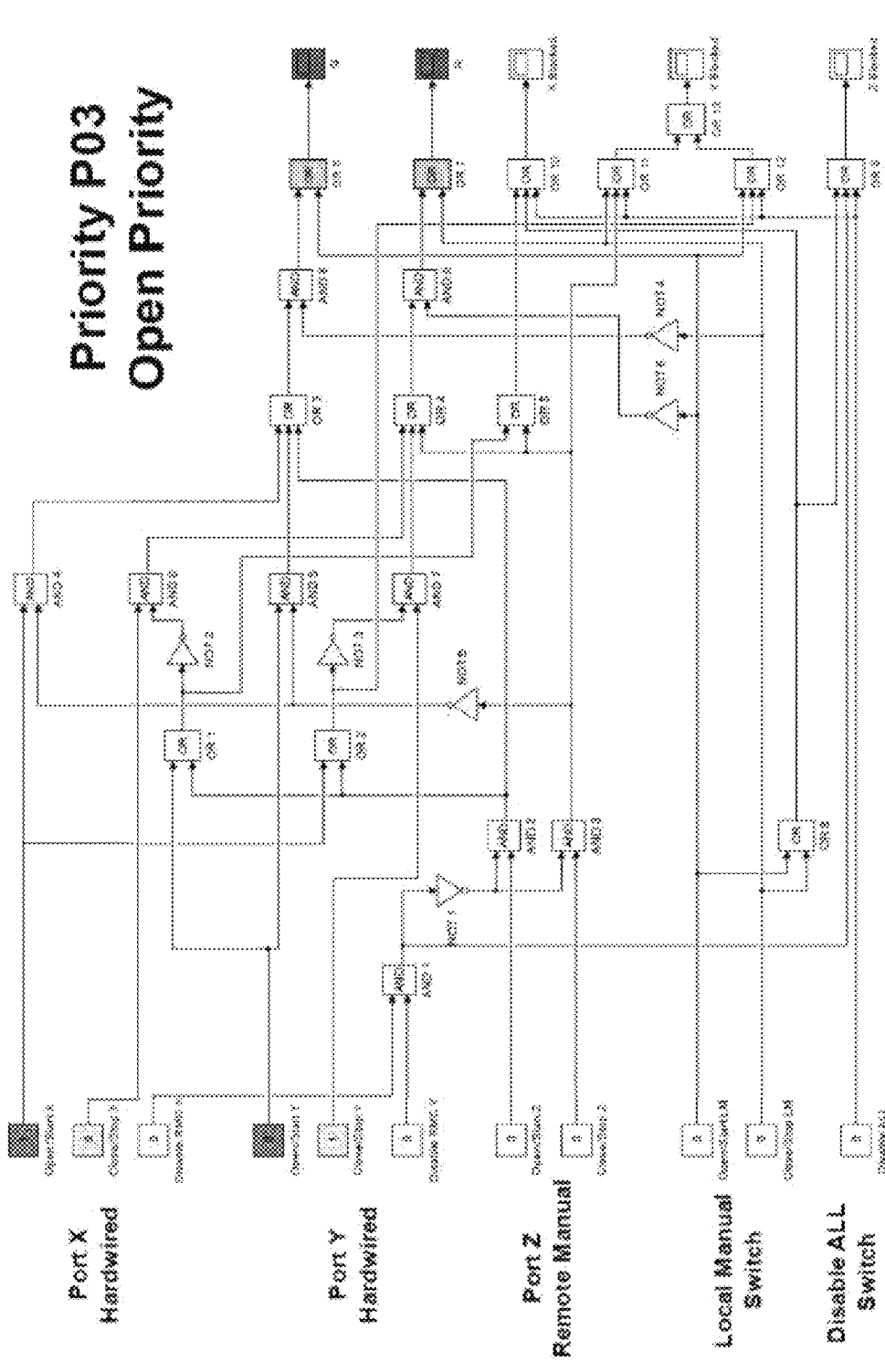
FIG. 4 shows a logic circuit corresponding to P03 setting in the priority logic of a CIM according to the present disclosure.

FIG. 4 shows a logic circuit corresponding to P03 setting in the priority logic of a CIM according to the present disclosure. Input signals of P03 are shown below. In the case of P03, command signals of the ports X and Y, which act as two host systems, are received in addition to the signals from the port Z and the LMS.

Input signal

Port X (1) Open/Start X (CMX1)

(2) Close/Stop X (CMX2)

(3) Disable port Z (CMX 3)

Port Y (1) Open/Start Y (CMY1)

(2) Close/Stop Y (CMY2)

(3) Disable port Z (CMY3)

Port Z (1) Open/Start Z (CMZ1)

(2) Close/Stop Z (CMZ2)

Local manual switch (1) Open/Start LM (2) Close/Stop LM

Disable ALL SW

Manual control (port Z, LMS) has priority over the host system (port X, port Y). When command signals are received simultaneously from both host systems, the P03 setting puts higher priority to the Open/Start command. The command signal sets priority based on the priority logic to generate output signals Q, R. The output signal is passed to the universal component logic that generates a relay signal. The host system may transmit the disable port Z (CMX 3, CMY 3) signal in addition to the Open/Start and Close/Stop commands, and if the corresponding command signals are transmitted simultaneously from both host systems, the command signal from port Z is ignored. In addition to the above, block signals based on priority are generated.

Output signal (1) Open/Start (Q)

(2) Close/Stop (R)

Block signal (1) X Blocked (2) Y Blocked (3) Z Blocked

Figure 5:
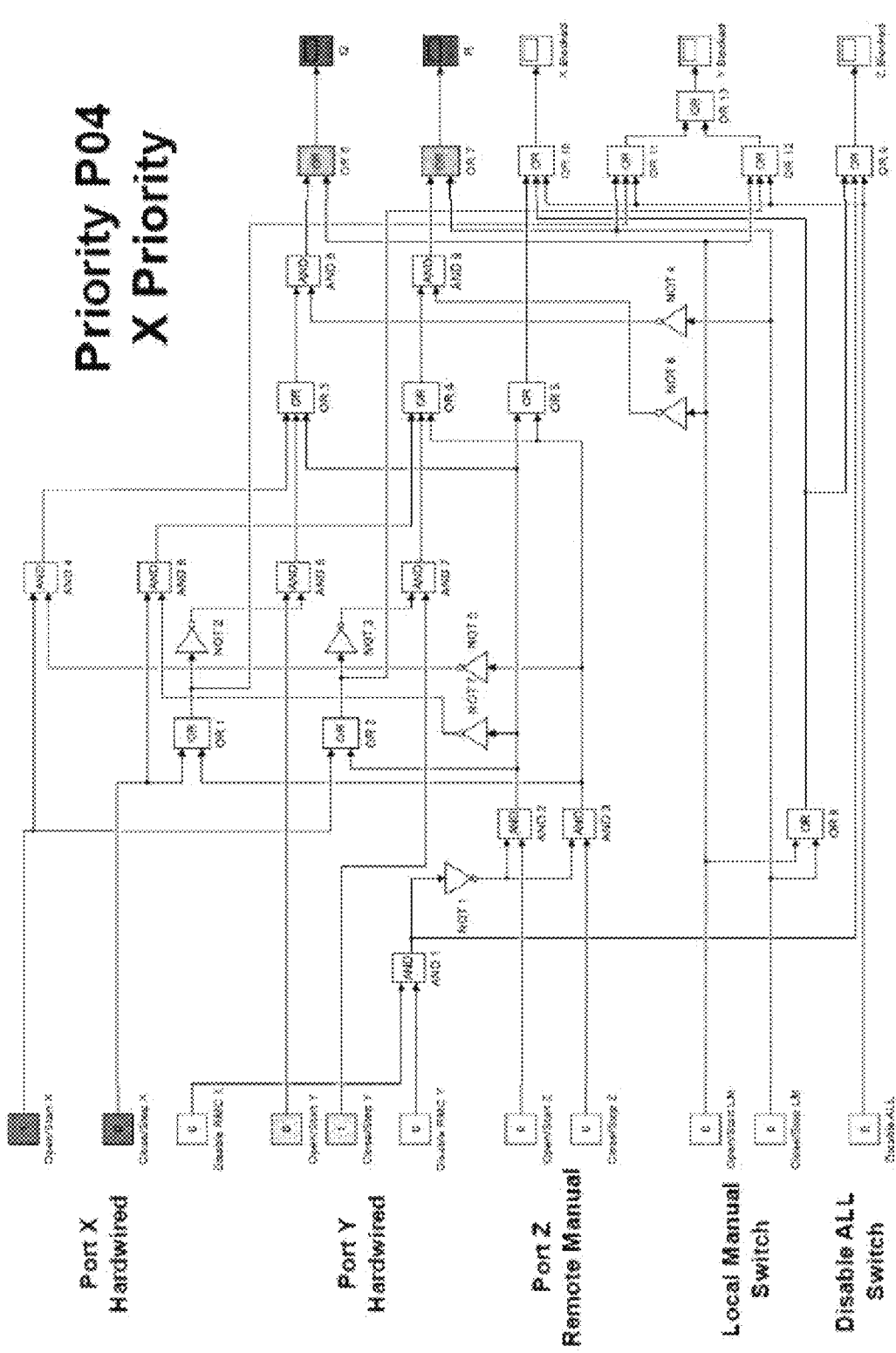
FIG. 5 shows a logic circuit corresponding to P04 setting in the priority logic of a CIM according to the present disclosure.

FIG. 5 shows a logic circuit corresponding to P04 setting in the priority logic of a CIM according to the present disclosure. Input signals of P04 are shown below.

Input signal
Port X
(1) Open/Start X (CMX1)
(2) Close/Stop X (CMX2)
(3) Disable port Z (CMX 3)
Port Y
(1) Open/Start Y (CMY1)
(2) Close/Stop Y (CMY2)
(3) Disable port Z (CMY3)
Port Z
(1) Open/Start Z(CMZ1)
(2) Close/Stop Z (CMZ2)
Local manual switch
(1) Open/Start LM
(2) Close/Stop LM
Disable ALL SW Manual control (port Z, LMS) has priority over the host system (port X, port Y). When command signals are received simultaneously from both host systems, the P04 setting puts higher priority to the port X command. The command signal sets priority based on the priority logic to generate output signals Q, R. The output signal is passed to the universal component logic that generates a relay signal. The host system may transmit the disable port Z (CMX 3, CMY 3) signal in addition to the Open/Start and Close/Stop commands, and if the corresponding command signals are transmitted simultaneously from both host systems, the command signal from port Z is ignored. In addition to the above, block signals based on priority are generated.

Figure 6:
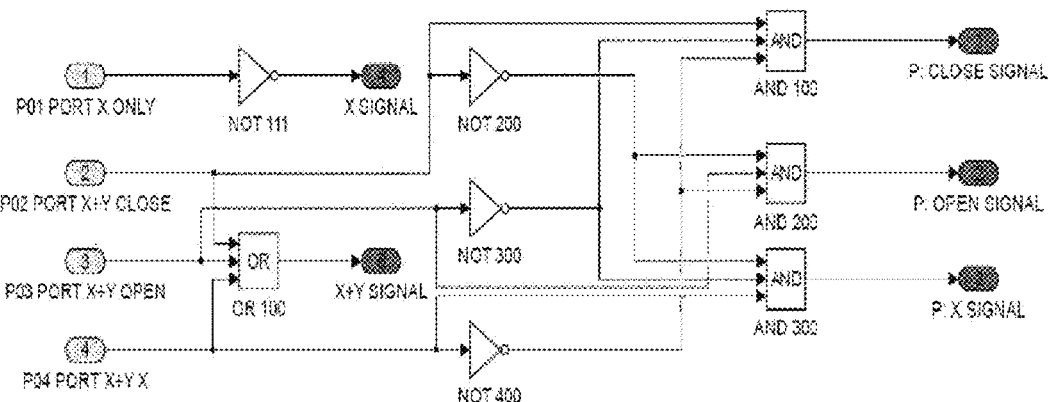
FIG. 6 is a block diagram composed by integrating P01 to P04 settings based on the priority logic according to the present disclosure.
Figure 7:
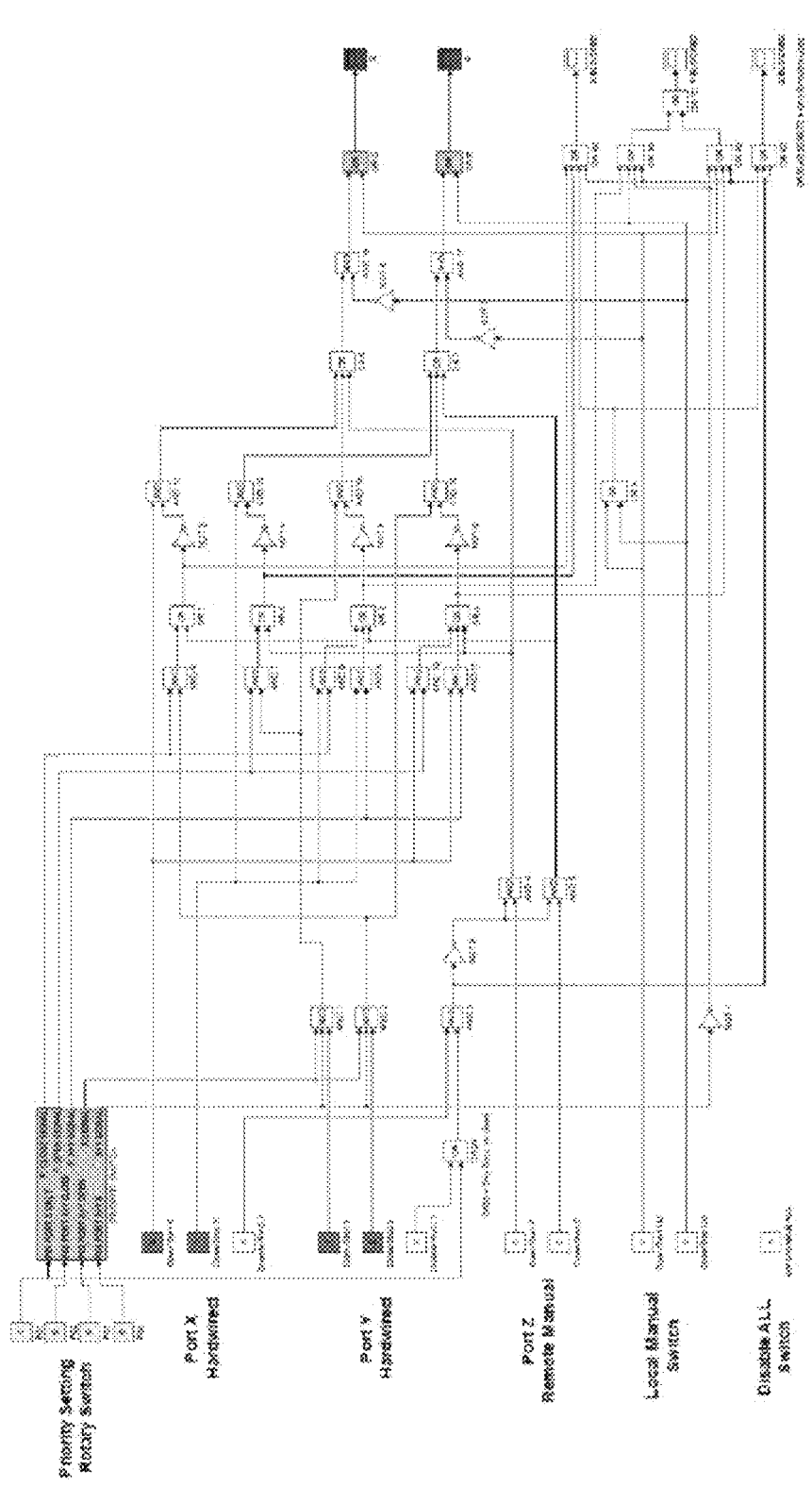
FIG. 7 is a logic circuit composed by integrating P01 to P04 settings based on the priority logic according to the present disclosure.

Output signal
(1) Open/Start (Q)
(2) Close/Stop (R)
Block signal
(1) X Blocked
(2) Y Blocked
(3) Z Blocked FIG. 6 is a block diagram composed by integrating P01 to P04 settings based on the priority logic according to the present disclosure, and FIG. 7 is a logic circuit composed by integrating P01 to P04 settings based on the priority logic according to the present disclosure.

As shown in FIGS. 6 and 7, according to the present disclosure, the priority logic of the CIM may be set by selecting one of P01 to P04 settings using a rotary switch without involving any jumpers.

In what follows, the component logic (universal component logic or buffer logic) implemented in the CIM processor according to the present disclosure will be described.

The universal component logic operates a controlling component (field device) and provides a fast interlock between a component command signal that conveys information on the state of the component and a component feedback signal. There are various components in the APR1400 nuclear power plants (e.g., Shin-Kori 3, 4, 5, 6; Shin Hanul 1, 2; and Baraka 1, 2, 3, 4), and 14 types of components are operated by the CIM, as shown in Table 3 below.

TABLE 3

| Group No. | Component type details |
| --- | --- |
| G01 | Load center breakers - port X only |
| G02 | Reversing motor starters for full throw MOV - port X only |
| G03 | Solenoid or damper coil - port X only |
| G04 | Non-reversing motor starters - port X only |
| G05 | Fire damper coil - port X only |

TABLE 3-continued

| Group No. | Component type details |
| --- | --- |
| G06 | Reversing motor starters for throttling MOV - port X only |
| G07 | Solenoid - Close priority |
| G08 | Reversing motor starters for full throw MOV - Open priority |
| G09 | Load center breakers - Start priority |
| G10 | Reversing motor starters for full throw MOV - Close priority |
| G11 | Solenoid or damper coil - Open priority |
| G12 | Reversing motor starters for throttling MOV - port X priority |
| G13 | Load center breakers without anti-pumping - port X only |
| G14 | Load center breakers without anti-pumping - Start priority |

The Westing House's CIM, used in existing nuclear power plants, utilizes jumper settings embedded in the universal component logic to set specific functions of the CIM for a given component. The component logic uses the output signals Q and R transmitted from the priority logic and the feedback signals CIN1 to CIN8 of the component as inputs, and the final output comprises K1CTRL and K2CTRL signals driving relays K1 and K2 installed on a base board of the CIM and K1PERM and K2PERM signals used for a diagnosis function. The 14 types of components may be classified into 7 types of component groups as shown in Table 4 based on their operating method and universal component logic.

TABLE 4

| Group No. | Component type details | Class |
| --- | --- | --- |
| G01 | Load center breakers - port X only | B01 |
| G02 | Reversing motor starters for full throw MOV - port X only | B02 |
| G03 | Solenoid or damper coil - port X only | B03 |
| G04 | Non-reversing motor starters - port X only | B04 |
| G05 | Fire damper coil - port X only | B05 |
| G06 | Reversing motor starters for throttling MOV - port X only | B06 |
| G07 | Solenoid - Close priority | B03 |
| G08 | Reversing motor starters for full throw MOV - Open priority | B02 |
| G09 | Load center breakers - Start priority | B01 |
| G10 | Reversing motor starters for full throw MOV - Close priority | B02 |
| G11 | Solenoid or damper coil - Open priority | B03 |
| G12 | Reversing motor starters for throttling MOV - port X priority | B06 |
| G13 | Load center breakers without anti-pumping - port X only | B07 |
| G14 | Load center breakers without anti-pumping - Start priority | B07 |

Component group (1) B01: Load center breakers (2) B02: Reversing motor starters for full throw MOV (3) B03: Solenoid or damper coil (4) B04: Non-reversing motor starters (5) B05: Fire damper coil (6) B06: Reversing motor starters for throttling MOV (7) B07: Load center breakers without anti-pumping In what follows, each of the component groups will be described.

First, load center breakers in the B01 group generally respond promptly to a command signal and mechanically retain their state after the command is executed. If Open and Close commands are received simultaneously, trip breakers take priority. The corresponding feedback signal holds the following meaning.

B01—Feedback signal of load center breakers
(1) CIN1—Breaker Closed
(2) CIN2—Breaker Open (not used)
(3) CIN3—Not used
(4) CIN4—Not used
(5) CIN5—Not used
(6) CIN6—Ready for operation FIG. 8 illustrates a logic circuit of a component logic (universal component logic, buffer logic) for operating load center breakers according to the present disclosure.

Reversing motor starters are divided into full throw and throttling types. In the case of full throw type controlled by B02, the command signal needs to be latched to ensure continuous valve operation until the MOV is fully opened or closed. A torque limit switch may transmit a torque limit value at which the valve reaches its open or close stop, which resets the command signal accordingly. However, the torque limit switch function is not utilized. Therefore, the corresponding feedback signal has the following meaning.

B02—Feedback signal of reversing motor starters for full throw MOV
(1) CIN1—Motor starter is driven to fully open the valve
(2) CIN2—Motor starter is driven to fully close the valve
(3) CIN3—Not used
(4) CIN4—Not used
(5) CIN5—Not used
(6) CIN6—Ready for operation FIG. 9 illustrates a logic circuit of a universal component logic for operating reversing motor starters for full throw MOV according to the present disclosure.

The solenoid or damper coil in the B03 group should latch the current command until an opposing command is received. Therefore, the component's feedback signal is solely used as a notification signal for the host system, without being utilized for the interlock logic. The corresponding feedback signal has the following meaning.

B03—Feedback signal of solenoid or damper coil
(1) CIN1—The coil is energized, and the valve is fully opened.
(2) CIN2—The coil is de-energized, and the valve is fully closed
(3) CIN3—Not used
(4) CIN4—Not used
(5) CIN5—Not used
(6) CIN6—Ready for operation FIG. 10 illustrates a logic circuit of a universal component logic for operating a solenoid or damper coil according to the present disclosure.

In the presence of a stop command, the start command of the non-reversing motor starters in the B04 group is deactivated. Also, since a command signal needs to be continuously applied, the current command signal is latched. Relays are driven regardless of component feedback input signals. The corresponding feedback signal has the following meaning.

B04—Feedback signal of non-reversing motor starters
(1) CIN1—Not used
(2) CIN2—Not used
(3) CIN3—Not used
(4) CIN4—Not used
(5) CIN5—Not used
(6) CIN6—Ready for operation FIG. 11 illustrates a logic circuit of a universal component logic for operating non-reversing motor starters according to the present disclosure.

The fire damper coil in the B05 group should latch the current command until an opposing command is received. Therefore, the component's feedback signal is solely used as a notification signal for the host system, without being utilized for the interlock logic. The corresponding feedback signal has the following meaning.

B05—Feedback signal of fire damper coil
(1) CIN1—The coil is energized, and the valve is fully opened.
(2) CIN2—The coil is de-energized, and the valve is fully closed
(3) CIN3—Not used
(4) CIN4—Not used
(5) CIN5—Not used
(6) CIN6—Ready for operation FIG. 12 illustrates a logic circuit of a universal component logic for operating a fire damper coil according to the present disclosure.

As described above, reversing motor starters are divided into full throw and throttling types. In the case of full throw type controlled by B06, a command signal is not latched to maintain the valve in the middle position. A torque limit switch may transmit a torque limit value at which the valve reaches its open or close stop, which resets the command signal accordingly. Therefore, the corresponding feedback signal has the following meaning.

B06—Feedback signal of reversing motor starters for throttling MOV
(1) CIN1—The motor starter is actuated, and the valve is fully opened.
(2) CIN2—The motor starter is stopped, and the valve is fully closed
(3) CIN3—Torque limit switch in the opening direction
(4) CIN4—Torque limit switch in the closing direction
(5) CIN5—Not used
(6) CIN6—Ready for operation FIG. 13 illustrates a logic circuit of a universal component logic for operating reversing motor starters for throttling MOV according to the present disclosure.

First, load center breakers without anti-pumping in the B07 group generally respond promptly to a command signal and mechanically retain their state after the command is executed. If Open and Close commands are received simultaneously, trip breakers take priority. Also, in the event of a failure, an anti-pumping logic is employed to prevent repeated open and close operations. The corresponding feedback signal holds the following meaning.

B07—Feedback signal of load center breakers without anti-pumping
(1) CIN1—Breaker closed
(2) CIN2—Breaker open
(3) CIN3—Not used
(4) CIN4—Not used
(5) CIN5—Not used
(6) CIN6—Ready for operation FIG. 14 illustrates a logic circuit of a universal component logic for operating load center breakers without anti-pumping according to the present disclosure.

The seven component groups may be classified into the following groups, which
share a similar operating method and component logic.
Three types of component groups having a similar operating method and component logic
(1) Load center breakers (LCB) group
B01: Load center breakers
B07: Load center breakers without anti-pumping (2) Motor starters (MS) group B02: Reversing motor starters for full throw MOV B04: Non-reversing motor starters B06: Reversing motor starters for throttling MOV (3) Solenoid or coil (SC) group B03: Solenoid or damper coil B05: Fire damper coil The present disclosure designs three universal component logics for the three component groups, respectively.

First, out of the 14 types of components, a total of four types shown in Table 5 correspond to the LCB Group; according to the universal component logic setting, the LCB group may be classified as load center breakers B01 and load center breakers without anti-pumping B07. For reference, Table 5 also shows the priority logic for each component.

TABLE 5

| Logic configuration of LCB group | | | |
|---|---|---|---|
| Group No. | Details | Priority | Buffer |
| 1 | Load center breakers | P01 | B01 |
| 9 | Load center breakers - Start priority | P03 | B01 |
| 13 | Load center breakers without anti-pumping - Port X only | P01 | B07 |
| 14 | Load center breakers without anti-pumping - Start priority | P03 | B07 |

FIG. 15 shows a circuit that integrates a universal component logic circuit for operating load center breakers and a universal component logic circuit for operating load center breakers without anti-pumping so that the universal component logic of the LCB group of the present disclosure may be set through a rotary switch input.

As shown in FIG. 15, in the present disclosure, the universal component logic of the LCB group may be set using either the load center breakers B01 or the load center breakers without anti-pumping B07.

Next, out of the 14 types of components, a total of six types shown in Table 6 correspond to the MS group; according to the universal component logic setting, the MS group may be classified as reversing motor starters for full throw B02, non-reversing motor starters B04, and reversing motor starters for throttling MOV B06. For reference, Table 6 also shows the priority logic for each component.

TABLE 6

| Logic configuration of MS group | | | |
|---|---|---|---|
| Group No. | Details | Priority | Buffer |
| 2 | Reversing motor starters for full throw MOV | P01 | B02 |
| 4 | Non-reversing motor starters | P01 | B04 |
| 6 | Reversing motor starters for throttling MOV | P01 | B06 |
| 8 | Reversing motor starters for full throw MOV | P03 | B02 |
| 10 | Reversing motor starters for full throw MOV - Close priority | P02 | B02 |
| 12 | Reversing motor starters for throttling MOV - Port X priority | P04 | B06 |

FIG. 16 shows a circuit that integrates a universal component logic circuit for operating reversing motor starters for full throw MOV, a universal component logic circuit for operating non-reversing motor starters, and a universal component logic circuit for operating reversing motor starters for throttling MOV so that the universal component logic of the MS group of the present disclosure may be set through a rotary switch input.

As shown in FIG. 16, in the present disclosure, the universal component logic of the MS group may be set using any one of the reversing motor starters for full throw MOV B02, non-reversing motor starters B04, and reversing motor starters for throttling MOV B06.

Lastly, out of the 14 types of components, a total of four types shown in Table 7 correspond to the SC group; according to the universal component logic setting, the SC group may be classified as solenoid or damper coil and fire damper coil. For reference, Table 7 also shows the priority logic for each component.

TABLE 7

| Logic configuration of SC group | | | |
|---|---|---|---|
| Group No. | Details | Priority | Buffer |
| 3 | Solenoid or damper coil | P01 | B03 |
| 5 | Fire damper coil | P01 | B05 |
| 7 | Solenoid - Close priority | P02 | B03 |
| 11 | Solenoid or damper coil - Open priority | P03 | B03 |

FIG. 17 shows a circuit that integrates a universal component logic circuit for operating a solenoid or damper coil and a universal component logic circuit for operating a fire damper coil so that the universal component logic of the SC group of the present disclosure may be set through a rotary switch input.

As shown in FIG. 17, in the present disclosure, the universal component logic of the SC group may be set using either the solenoid or damper coil B03 or the fire damper coil B05.

In the present disclosure, the component interface module (CIM) may be formed using three types of CIMS in which the respective universal component logics are implemented according to the three types of component groups. Specifically, the CIM according to the present disclosure is formed separately as a CIM in which a universal component logic for the LCB group is implemented, a CIM in which a universal component logic for the MS group is implemented, and a CIM in which a universal component logic for the SC group is implemented.

FIGS. 18 and 19 show a schematic drawing and a photo illustrating the front of a component interface module (CIM) for an LCB group according to the present disclosure, FIGS. 20 and 21 show a schematic drawing and a photo illustrating the front of a component interface module (CIM) for an MS group according to the present disclosure, and FIGS. 22 and 23 show a schematic drawing and a photo illustrating the front of a component interface module (CIM) for an SC group according to the present disclosure.

Referring to FIG. 18, the front of the component interface module (CIM) 1000 for the LCB group according to the present disclosure includes a four-contact rotary switch SW1 for priority setting (P Select), a control rotary switch SW2 for setting the universal component logic (B Select), an input/output indicator 1200 for displaying various input/output signals by the display unit 1100 for displaying currently controlled components and error states, a feedback signal indicator 1300 for displaying feedback signals, and a local manual switch SW3.

Specifically, the four-contact rotary switch SW1 for setting the priority (P Select) may be used to set priority by selecting one of P01 (or P1) to P04 (or P4) according to Table 5. In particular, P01 (or P1) or P03 (or P3) may be selected through the component interface module (CIM) 1000 for the LCB group according to the present disclosure.

Also, depending on the component to be controlled using the control rotary switch SW2 for setting the universal component logic (B Select), the universal component logic may be set by selecting either the load center breakers B01 or the load center breakers without anti-pumping B07. In the present embodiment, B1 of the rotary switch SW2 corresponds to the load center breakers B01, and B2 of the rotary switch SW2 corresponds to the load center breakers without anti-pumping B07. Also, the rotary switch SW2 may provide the disable all option to stop the operation of all components in case of an emergency.

The display unit 1100 displays the group of controlling components currently set or internal error states in the occurrence of an error. The display unit may be composed of 7-segment LEDs.

The input/output indicator 1200 displays input/output signals from an input port, and the feedback signal indicator 1300 displays feedback signals from the component.

The user on-site may manipulate the local manual switch SW3 to set the component as Close/Stop, Neutral, or Open/Start.

In addition to the above, various indicators are installed on the front of the CIM 1000 for the LCB group according to the present disclosure.

Referring to FIG. 20, the front of the component interface module (CIM) 2000 for the MS group according to the present disclosure includes a four-contact rotary switch SW1 for priority setting (P Select), a control rotary switch SW4 for setting the universal component logic (B Select), an input/output indicator 1200 for displaying various input/output signals by the display unit 1100 for logic setting and error display, a feedback signal indicator 1300 for displaying feedback signals, and a local manual switch SW3.

Specifically, the four-contact rotary switch SW1 for setting the priority (P Select) may be used to set priority by selecting one of P01 (or P1) to P04 (or P4) according to Table 6.

Also, depending on the component to be controlled using the rotary switch SW4 for setting the universal component logic (B Select), the universal component logic may be set by selecting one of the reversing motor starters for full throw MOV B02, the non-reversing motor starters B04, and reversing motor starters for throttling MOV B06. In the present embodiment, B1 of the rotary switch SW4 corresponds to the reversing motor starters for full throw MOV B02, B2 corresponds to the non-reversing motor starters B04, and B3 corresponds to the reversing motor starters for throttling MOV B06. Also, the rotary switch SW4 may provide the disable all option to stop the operation of all components in case of an emergency.

Referring to FIG. 22, the front of the component interface module (CIM) 3000 for the SC group according to the present disclosure includes a four-contact rotary switch SW1 for priority setting (P Select), a control rotary switch SW6 for setting the universal component logic (B Select), an input/output indicator 1200 for displaying various input/output signals by the display unit 1100 for logic setting and error display, a feedback signal indicator 1300 for displaying feedback signals, and a local manual switch SW3.

Specifically, the four-contact rotary switch SW1 for setting the priority (P Select) may be used to set priority by selecting one of P01 (or P1) to P04 (or P4) according to Table 7. In particular, the CIM 100 for the SC group according to the present disclosure may select one of P01 (or P1) to P03 (or P3).

Also, depending on the component to be controlled using the rotary switch SW6 for setting the universal component logic (B Select), the universal component logic may be set by selecting one of the solenoid or damper coil B03 or the fire damper coil B05. In the present embodiment, B1 of the rotary switch SW6 corresponds to the solenoid or damper coil B03, and B2 corresponds to the fire damper coil B05. Also, the rotary switch SW6 may provide the disable all option to stop the operation of all components in case of an emergency.

Meanwhile, the CIM has to ensure operability through periodic tests. A diagnostic analysis logic may be implemented for this purpose. The diagnostic analysis logic tests the function of checking the priority logic and the universal component logic, the operability of relay drivers, and whether the voltage and current monitors operate properly. Here, the display unit 1100 of the CIM according to the present disclosure displays an internal error state as well as a group of controlling components currently set.

Specifically, the CIM of the present disclosure generates a CIM fault signal according to diagnosis and internal functions. The types of CIM fault signals are as follows.

Internal fault

Power reset: 5V voltage reset

Watchdog timer: FPGA watchdog timer (2 khz)

LOGVOK: 5V voltage level check

MOD_CON GND: Check ground connection with base board

Force error: Forced error

External error

FVOLTOK: Contact wetting voltage check

GND fault: Ground check

K1/K2 relay coil fault: K1/K2 relay coil monitoring signal fault

K1/K2 relay contact fault: K1/K2 relay contact monitoring signal fault

K1/K2 fault: Diagnostic K1/K2 fault

In the event of any of the above situations, a CIM fault signal is generated, and the generated CIM fault signal is transmitted to port X, which is the host system. Also, an error state is displayed according to its priority on the display unit 1100 of the CIM of the present disclosure.

Tables 8, 9, and 10 below show three digits on the 7-segments corresponding to the respective error states of the LCB, MS, or SC groups according to the present disclosure. The display unit 1100 displays logic settings when there is no error in the CIM and displays errors in order of priority of the error states.

TABLE 8

| | | Display of error states of LCB group | |
| State | 7-Segment display | Description | Priority |
|---|---|---|---|
| Abnormal | I.E1 | Power Reset | 1 |
| Abnormal | I.E2 | Watchdog Timer | 2 |
| Abnormal | I.E3 | Force Error | 3 |
| Abnormal | I.E4 | Mod_Con GND | 4 |
| Abnormal | I.E5 | LOGVOK | 5 |
| Abnormal | E.E1 | FVOLTOK | 6 |
| Abnormal | E.E2 | GND FAULT | 7 |
| Abnormal | E.E3 | K1 Coil Fault | 8 |
| Abnormal | E.E4 | K2 Coil Fault | 9 |
| Abnormal | E.E5 | K1 Contact Fault | 10 |

TABLE 8-continued

| | 7-Segment | | |
|---|---|---|---|
| State | display | Description | Priority |
| Abnormal | E.E6 | K2 Contact Fault | 11 |
| Abnormal | E.E7 | K1 Diagnostic Fault | 12 |
| Abnormal | E.E8 | K2 Diagnostic Fault | 13 |
| Normal | C.01 | P-1, B-1 | 14 |
| Normal | C.13 | P-1, B-2 | 14 |
| Normal | CE.1 | P-2, B-1 | 14 |
| Normal | CE.2 | P-2, B-2 | 14 |
| Normal | C.09 | P-3, B-1 | 14 |
| Normal | C.14 | P-3, B-2 | 14 |
| Normal | CE.3 | P-4, B-1 | 14 |
| Normal | CE.4 | P-4, B-2 | 14 |

*Display of error states of LCB group*

TABLE 9

*Display of error states of MS group*

| | 7-Segment | | |
|---|---|---|---|
| State | display | Description | Priority |
| Abnormal | I.E1 | Power Reset | 1 |
| Abnormal | I.E2 | Watchdog Timer | 2 |
| Abnormal | I.E3 | Force Error | 3 |
| Abnormal | I.E4 | Mod_Con GND | 4 |
| Abnormal | I.E5 | LOGVOK | 5 |
| Abnormal | E.E1 | FVOLTOK | 6 |
| Abnormal | E.E2 | GND FAULT | 7 |
| Abnormal | E.E3 | K1 Coil Fault | 8 |
| Abnormal | E.E4 | K2 Coil Fault | 9 |
| Abnormal | E.E5 | K1 Contact Fault | 10 |
| Abnormal | E.E6 | K2 Contact Fault | 11 |
| Abnormal | E.E7 | K1 Diagnostic Fault | 12 |
| Abnormal | E.E8 | K2 Diagnostic Fault | 13 |
| Normal | C.02 | P-1, B-1 | 14 |
| Normal | C.04 | P-1, B-2 | 14 |
| Normal | C.06 | P-1, B-3 | 14 |
| Normal | C.10 | P-2, B-1 | 14 |
| Normal | CE.1 | P-2, B-2 | 14 |
| Normal | CE.2 | P-2, B-3 | 14 |
| Normal | C.08 | P-3, B-1 | 14 |
| Normal | CE.3 | P-3, B-2 | 14 |
| Normal | CE.4 | P-3, B-3 | 14 |
| Normal | CE.5 | P-4, B-1 | 14 |
| Normal | CE.6 | P-4, B-2 | 14 |
| Normal | C.12 | P-4, B-3 | 14 |

TABLE 10

*Display of error states of SC group*

| | 7-Segment | | |
|---|---|---|---|
| State | display | Description | Priority |
| Abnormal | I.E1 | Power Reset | 1 |
| Abnormal | I.E2 | Watchdog Timer | 2 |
| Abnormal | I.E3 | Force Error | 3 |
| Abnormal | I.E4 | Mod_Con GND | 4 |
| Abnormal | I.E5 | LOGVOK | 5 |
| Abnormal | E.E1 | FVOLTOK | 6 |
| Abnormal | E.E2 | GND FAULT | 7 |
| Abnormal | E.E3 | K1 Coil Fault | 8 |
| Abnormal | E.E4 | K2 Coil Fault | 9 |
| Abnormal | E.E5 | K1 Contact Fault | 10 |
| Abnormal | E.E6 | K2 Contact Fault | 11 |
| Abnormal | E.E7 | K1 Diagnostic Fault | 12 |
| Abnormal | E.E8 | K2 Diagnostic Fault | 13 |
| Normal | C.03 | P-1, B-1 | 14 |
| Normal | C.05 | P-1, B-2 | 14 |
| Normal | C.07 | P-2, B-1 | 14 |
| Normal | CE.1 | P-2, B-2 | 14 |
| Normal | C.11 | P-3, B-1 | 14 |

TABLE 10-continued

*Display of error states of SC group*

| | 7-Segment | | |
|---|---|---|---|
| State | display | Description | Priority |
| Normal | CE.2 | P-3, B-2 | 14 |
| Normal | CE.3 | P-4, B-1 | 14 |
| Normal | CE.4 | P-4, B-2 | 14 |

Therefore, the user may check the error state generated in the component interface module (CIM) more easily and conveniently by referring to the segment display on the display unit 1100.

Throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

INDUSTRIAL APPLICABILITY

According to the component interface module (CIM) of the present disclosure, a user may set a logic using a rotary switch without involving jumper settings in selecting a target component to be controlled, thereby enhancing user convenience; accordingly, the enhanced user convenience facilitates stable operation and maintenance of nuclear power plants more conveniently. In addition, since the user may easily check the operation and error states of the component interface module (CIM), human error due to maintenance may be reduced.

The invention claimed is:

1. A component interface module (CIM) for managing interface between a control system, which generates component command signals, and components, which generate component feedback signals, wherein the components are classified into first to third component groups according to an operating method and a component logic, the component interface module comprising first to third component interface modules configured to control the first to third component groups respectively, wherein each of the first to third component interface modules comprises:

an input port to which a respective component command signal is input from the control system, a processor including a priority logic circuit for configuring a priority for the component command signals; and a component logic circuit generating a component control signal by integrating a component feedback signal of the component with a priority component command signal selected by the priority logic and including a dedicated logic circuit for each of the first to third component interface modules, and an output device outputting the component control signal to the component, wherein the priority logic of each of the first to third component interface modules is set by selecting any one of four settings of the priority logic circuit using a four-contact rotary switch wherein each contact corresponds to one of the four settings, and the component logic of each of the first to third component interface modules is set using a control rotary switch, wherein the control system includes a loop controller, a diverse protection system, a diverse manual actuation system, and a local manual switch, wherein the input port includes a port X to which the component command signal is input from the loop controller, a port Y to which the component command signal is input from the diverse protection system, and a port Z to which the component command signal is input from the diverse manual actuation system, and wherein the four settings of the priority logic circuit comprise a P01 setting corresponding to receiving a signal only from the port X, a P02 setting corresponding to receiving signals from the port X and the port Y and setting priority to closing, a P03 setting corresponding to receiving signals from the port X and the port Y and setting priority to opening, and a P04 setting corresponding to receiving signals from the port X and the port Y and setting priority to the port X.

2. The CIM of claim 1, further comprising a display unit for displaying a component under control or displaying a built-in error state according to a priority of the error state.

3. The CIM of claim 2, wherein the display unit is composed of 7-segment LEDs.

4. The CIM of claim 1, wherein the first component group is a load center breaker group, the second component group is a motor starter group, and the third component group is a solenoid or coil group.

5. The CIM of claim 4, wherein the components of the load center breaker group are classified into either a load center breaker or a load center breaker without anti-pumping.

6. The CIM of claim 4, wherein the components of the motor starter group are classified into one of a reversing motor starter for full throw MOV, a non-reversing motor starter, and a reversing motor starter for throttling MOV.

7. The CIM of claim 4, wherein the components of the solenoid or coil group are classified into one of a solenoid or damper coil and a fire damper coil.

8. The CIM of claim 5, wherein the component logic of the first component interface module includes a B1 setting corresponding to a load center breaker and a B2 setting corresponding to a load center breaker without anti-pumping.

9. The CIM of claim 6, wherein the component logic of the second component interface module includes a B1 setting for selecting a reversing motor starter for full throw MOV, a B2 setting for selecting a non-reversing motor starter, and a B3 setting for selecting a reversing motor starter for throttling MOV.

10. The CIM of claim 7, wherein the component logic of the third component interface module includes a B1 setting for selecting a solenoid and damper coil and a B2 setting for selecting a fire damper coil.

* * * * *